(12) United States Patent
Watanabe et al.

(10) Patent No.: US 9,347,344 B2
(45) Date of Patent: May 24, 2016

(54) VARIABLE-CAPACITY OIL PUMP AND OIL SUPPLY SYSTEM USING SAME

(71) Applicant: Hitachi Automotive Systems, Ltd., Hitachinaka-shi, Ibaraki (JP)

(72) Inventors: Yasushi Watanabe, Kanagawa (JP); Hideaki Ohnishi, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/421,288

(22) PCT Filed: Jul. 24, 2013

(86) PCT No.: PCT/JP2013/070030
§ 371 (c)(1),
(2) Date: Feb. 12, 2015

(87) PCT Pub. No.: WO2014/038302
PCT Pub. Date: Mar. 13, 2014

(65) Prior Publication Data
US 2015/0218983 A1    Aug. 6, 2015

(30) Foreign Application Priority Data

Sep. 7, 2012 (JP) ................ 2012-196714

(51) Int. Cl.
*F04C 14/18* (2006.01)
*F04C 14/22* (2006.01)
(Continued)

(52) U.S. Cl.
CPC ............ *F01M 11/03* (2013.01); *B01D 35/005* (2013.01); *F04C 2/3442* (2013.01); *F04C 2/36* (2013.01);
(Continued)

(58) Field of Classification Search
CPC ........ F04C 2/36; F04C 2/3442; F04C 13/055; F04C 14/226
See application file for complete search history.

(56) References Cited

U.S. PATENT DOCUMENTS

2003/0231965 A1    12/2003  Hunter et al.
2006/0137939 A1*   6/2006  Smolong et al. ............. 184/6.12
(Continued)

FOREIGN PATENT DOCUMENTS

JP    2004-251267 A    9/2004
JP    2010-526237 A    7/2010
(Continued)

OTHER PUBLICATIONS

International Search Report dated Oct. 29, 2013 with English translation (three (3) pages).

*Primary Examiner* — Krishnan S Menon
*Assistant Examiner* — Bradley R Spies
(74) *Attorney, Agent, or Firm* — Crowell & Moring LLP

(57) ABSTRACT

Provided is a variable-capacity oil pump capable of stably securing a required pump discharge volume and discharge pressure even with a clogged oil filter and/or an electromagnetic valve failed. The oil pump is provided with a first control chamber for applying a force under oil pressure from a main oil gallery in a direction for decreasing of the eccentricity of a cam ring, a second control chamber for applying a force under oil pressure from the oil gallery in cooperation with a spring force in a direction for increasing of the cam-ring eccentricity, a first branch flow path that connects the oil gallery and the first control chamber, and a second branch flow path branched from the first branch flow path and communicating with the second control chamber via the electromagnetic valve. Two oil filters are disposed in the oil gallery and the first branch flow path, respectively.

8 Claims, 18 Drawing Sheets

(51) Int. Cl.

| | | |
|---|---|---|
| *F04C 14/24* | (2006.01) | |
| *F04C 14/28* | (2006.01) | |
| *F01M 11/03* | (2006.01) | |
| *F04C 2/344* | (2006.01) | |
| *B01D 35/00* | (2006.01) | |
| *F04C 2/36* | (2006.01) | |
| *F04C 13/00* | (2006.01) | |
| *F04C 15/06* | (2006.01) | |

(52) U.S. Cl.
 CPC ............. *F04C 13/005* (2013.01); *F04C 14/226* (2013.01); *F04C 15/06* (2013.01); *F04C 14/28* (2013.01); *F04C 2240/811* (2013.01)

(56) References Cited

U.S. PATENT DOCUMENTS

| | | |
|---|---|---|
| 2010/0139611 A1 | 6/2010 | Hunter |
| 2010/0221126 A1* | 9/2010 | Tanasuca et al. ............. 417/218 |
| 2010/0226799 A1* | 9/2010 | Watanabe et al. ............. 417/364 |
| 2011/0014078 A1* | 1/2011 | Ono et al. ..................... 418/166 |
| 2012/0148423 A1 | 6/2012 | Wagner |

FOREIGN PATENT DOCUMENTS

| | | |
|---|---|---|
| JP | 2012-77754 A | 4/2012 |
| WO | WO 2010/142611 A1 | 12/2010 |

\* cited by examiner

VARIABLE-CAPACITY OIL PUMP AND OIL SUPPLY SYSTEM USING SAME

TECHNICAL FIELD

The present invention relates to a variable-capacity oil pump of an automotive internal combustion engine and an oil supply system using the same.

BACKGROUND ART

In recent years, in order to use oil discharged from an oil pump for apparatuses requiring different discharge pressures, for example, each sliding part of an engine, a variable valve actuation device configured to control operating characteristics of engine valves, and the like, there is a demand for two-stage characteristics, namely, a low pressure characteristic and a high pressure characteristic.

To satisfy such a demand, a variable-capacity oil pump, for instance as disclosed in the following Patent document 1, is provided with an eccentric ring that moves against a spring biasing force so as to change its eccentricity with respect to a rotor, and an electromagnetic valve for switching the direction of action of discharge pressure. The directional switching control is made via the electromagnetic valve so as to enable pump discharge pressure to act on the eccentric ring in a direction in which the eccentricity decreases or in a direction in which the eccentricity increases.

Also, in the aforementioned variable-capacity oil pump, an oil filter is disposed downstream of a main oil gallery or upstream of the electromagnetic valve, for preventing contaminants, such as metal debris in the oil, from being bitten into the electromagnetic valve.

CITATION LIST

Patent Literature

Patent document 1: Japanese patent provisional publication No. 2004-251267 (A)

SUMMARY OF INVENTION

Technical Problem

However, in the variable-capacity oil pump of the Patent document 1, when the oil filter has clogged or when the electromagnetic valve has failed due to breaking, oil flow toward the downstream side of the oil filter is blocked, and thus oil is flown into a control chamber due to an oil leakage in the pump body. A force, caused by hydraulic pressure of the flown oil, acts on the eccentric ring only in the direction in which the eccentricity decreases, whereas oil, acting in the direction in which the eccentricity increases, is discharged. Therefore, there is a tendency for the eccentric ring to move in the direction in which the eccentricity of the eccentric ring decreases depending on the pump discharge pressure.

Hence, there is a possibility that a minimum required oil discharge volume produced by the pump cannot be secured.

It is, therefore, in view of the previously-described drawbacks of the prior art, an object of the invention to provide a variable-capacity oil pump capable of stably securing a required pump discharge volume and discharge pressure produced by the pump, even when an oil filter has clogged or an electromagnetic valve has failed.

Solution to Problem

According to the present invention, a variable-capacity oil pump comprises a rotor rotationally driven by an internal combustion engine, a plurality of vanes retractably located in an outer periphery of the rotor, a cam ring configured to house the rotor and the vanes on an inner peripheral side to define a plurality of operating oil chambers, and change an eccentricity of a center of an inner peripheral surface of the cam ring from a rotation center of the rotor by a displacement of the cam ring, a suction part configured to open into the operating oil chambers whose volumes increase when the cam ring has been displaced with respect to the rotation center of the rotor, a discharge part configured to open into the operating oil chambers whose volumes decrease when the cam ring has been displaced with respect to the rotation center of the rotor, a biasing mechanism configured to bias the cam ring in a direction in which the eccentricity of the cam ring with respect to the rotation center of the rotor increases, a first control chamber defined on an outer peripheral side of the cam ring and configured to apply a force, caused by introduction of oil pressure from a main oil gallery into the first control chamber, to the cam ring in a direction in which the eccentricity of the cam ring with respect to the rotor decreases, a second control chamber defined on the outer peripheral side of the cam ring and configured to apply a force, caused by introduction of the oil pressure from the main oil gallery into the second control chamber and by a pressure-receiving area set less than the first control chamber, to the cam ring in the direction in which the eccentricity of the cam ring with respect to the rotor increases, an electromagnetic valve configured to establish fluid-communication between the second control chamber and the main oil gallery in a de-energized state, and establish fluid-communication between the second control chamber and a low-pressure part in an energized state, a first control chamber flow path configured to connect a branch flow path branched from the main oil gallery and the first control chamber, a second control chamber flow path branched from the first control chamber flow path and configured to communicate with the second control chamber via the electromagnetic valve, and an oil filter disposed between a junction of the branch flow path to the main oil gallery and a branch part of the second control chamber flow path branched from the first control chamber flow path.

Advantageous Effects of Invention

According to the invention, it is possible to stably secure a required pump discharge volume and discharge pressure, even when an oil filter has clogged or an electromagnetic valve has failed.

DESCRIPTION OF EMBODIMENTS

Figure 1:
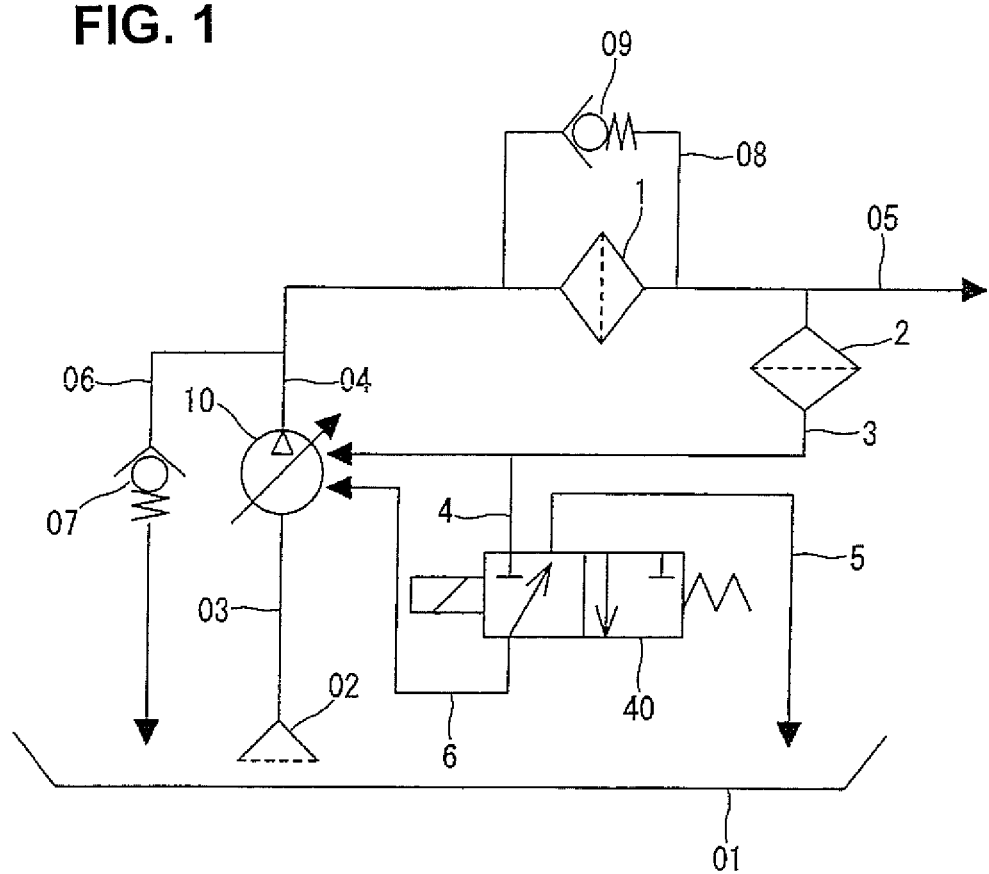
FIG. 1 is a schematic diagram illustrating a hydraulic circuit of an oil supply system that uses a variable-capacity oil pump according to a first embodiment of the present invention.

A mode for carrying out a variable-capacity oil pump and an oil supply system using the same according to the invention is hereinafter described in reference to the embodiments shown in the drawings. By the way, the present embodiments are applied to a variable-capacity oil pump configured to serve as an operating source of a variable valve actuation mechanism that varies valve timing of each engine valve of an automotive internal combustion engine, and supply lubricating oil to each sliding part of the engine, in particular, to each and every sliding portions of pistons and cylinder bores in the form of oil jet, and supply lubricating oil to journal bearings of a crankshaft.

[First Embodiment]

Referring to FIG. 1, there is shown the hydraulic diagram in the first embodiment. A variable-capacity oil pump 10 is rotated by a rotational driving force transmitted from the crankshaft of the internal combustion engine, and configured to suck oil stored in an oil pan 01 by way of a strainer 02 and a suction flow path 03, and discharge or deliver the oil from a discharge flow path 04 to a main oil gallery 05 of the engine.

A check-ball type relief valve 07 is disposed in a relief flow path 06 branched from the discharge flow path 04, for returning or diverting the oil flow back to the oil pan 01 when pump discharge pressure has excessively risen.

The aforementioned main oil gallery 05 is configured to supply oil to each sliding part of the engine, a valve timing control device, and journal bearings of the crankshaft. A first oil filter 1 is disposed or installed at the upstream side of the main oil gallery, facing the discharge flow path 04, for capturing foreign matter (contaminants) in the oil flow. Also provided is a bypass flow path 08 configured to bypass the first oil filter 1 of main oil gallery 05. A check-ball type bypass valve 09 is disposed in the bypass flow path 08, and configured to open so as to permit oil flow through the bypass flow path 08 into the downstream side, when the first oil filter 1 has clogged and thus the supply system has encountered a difficulty in flowing oil through the first oil filter.

A first branch flow path 3 is branched from the main oil gallery 05 downstream of the first oil filter 1. The downstream end of the first branch flow path 3 communicates with a first control oil chamber 31 (described later) of oil pump 10. Also, a second branch flow path 4 is branched from the middle of the first branch flow path.

The downstream side of the second branch flow path 4 communicates with a second control oil chamber 32 (described later) of oil pump 10 through a supply-and-drain flow path 6. An electromagnetic directional switching valve 40, which is classified as an electromagnetic valve, is provided at the joining portion of the second branch flow path to the supply-and-drain flow path 6.

Switching operation of electromagnetic directional switching valve 40 between ON (an energized state) and OFF (a de-energized state) is controlled by a control unit (not shown), so as to establish fluid-communication between the second branch flow path 4 and the supply-and-drain flow path 6 or fluid-communication between the second branch flow path 4 and a drain flow path 5. The concrete flow path configuration through the electromagnetic valve is described later.

Figure 6:
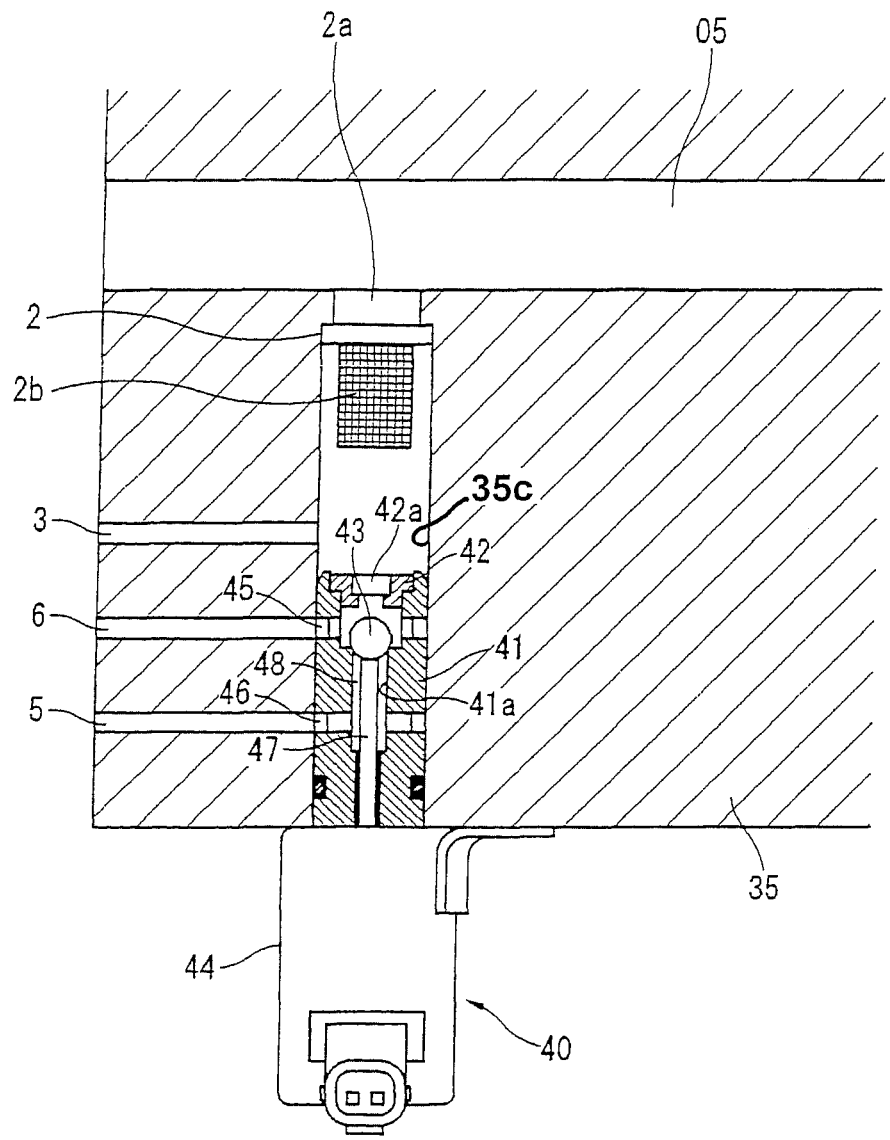
FIG. 6 is a cross-sectional view illustrating a state wherein an electromagnetic directional switching valve and a second oil filter used in the first embodiment are both installed.

A second oil filter 2 is installed in the vicinity of the branched portion of the first branch flow path 3 branched from the main oil gallery 05. As shown in FIG. 6, the second oil filter 2 is comprised of a substantially cylindrical main body 2a press-fitted into the large-diameter branched portion of the first branch flow path 3 branched from the main oil gallery 05, and a bottomed cylindrical metal mesh member 2b connected to one end of the main body 2a and configured to prevent contaminants mixed in the oil from flowing into the electromagnetic directional switching valve 40.

For instance, a filter paper or a metal mesh member is used as these oil filters, namely, first and second oil filters 1, 2. Taking into account the occurrence of clogging of a filter paper or a mesh member, an exchangeable cartridge type or a filter-paper replaceable type is used. Also, a mesh of the mesh member 2b of the second oil filter 2 is dimensioned to be greater in diameter than a mesh of the mesh member of the first oil filter 1.

The previously-discussed oil pump 10 is installed for instance at the front end of a cylinder block 35 of the internal combustion engine. As shown in FIGS. 2 to 5, the oil pump includes a housing, which housing is constructed by a pump body 11 configured to have an opening end and a C-shaped cross section and formed with a pump storage chamber 13 defining therein a cylindrical hollow space and a cover member 12 configured to hermetically close the opening end of pump body 11, a drive shaft 14 rotatably supported on the housing and configured to penetrate almost the central portion of pump storage chamber 13 and rotationally driven by an engine crankshaft, pump elements (pump components) comprised of a rotor 15 which is rotatably housed in the pump storage chamber 13 and whose center is fixedly connected to the drive shaft 14 and a plurality of vanes 16 retractably located in respective slits 15a radially cut in the outer periphery of rotor 15, a cam ring 17 placed on the outer peripheral side of the pump elements so as to permit the cam ring to be displaced eccentrically to the rotation center of rotor 15 and configured to define pump chambers 20, which are a plurality of operating oil chambers, in conjunction with the rotor 15 and vanes 16 adjacent to each other, a spring 18 housed in the pump body 11 and configured to permanently bias the cam ring 17 in a direction in which an eccentricity of cam ring 17 with respect to the rotation center of rotor 15 increases, and a pair of ring members 19, 19 slidably placed on both sides of the inner periphery of rotor 15 and having a diameter less than that of the inner periphery of rotor 15.

Figure 3:
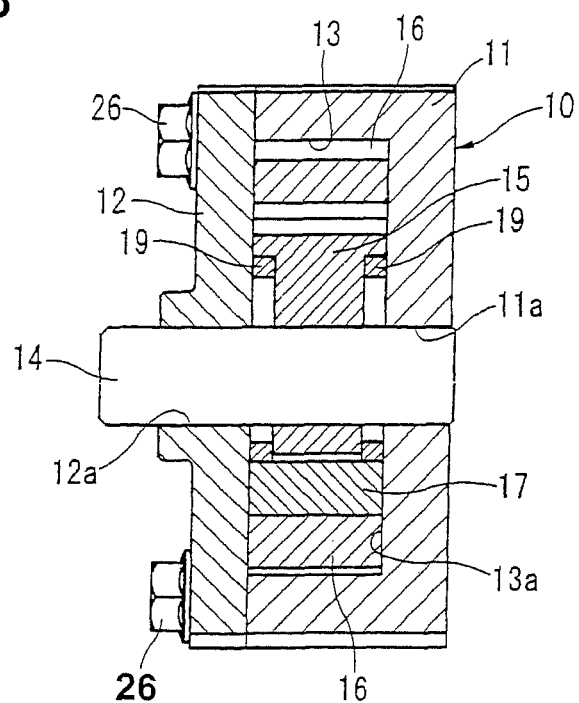
FIG. 3 is a longitudinal cross-sectional view of the oil pump of the first embodiment.
Figure 4:
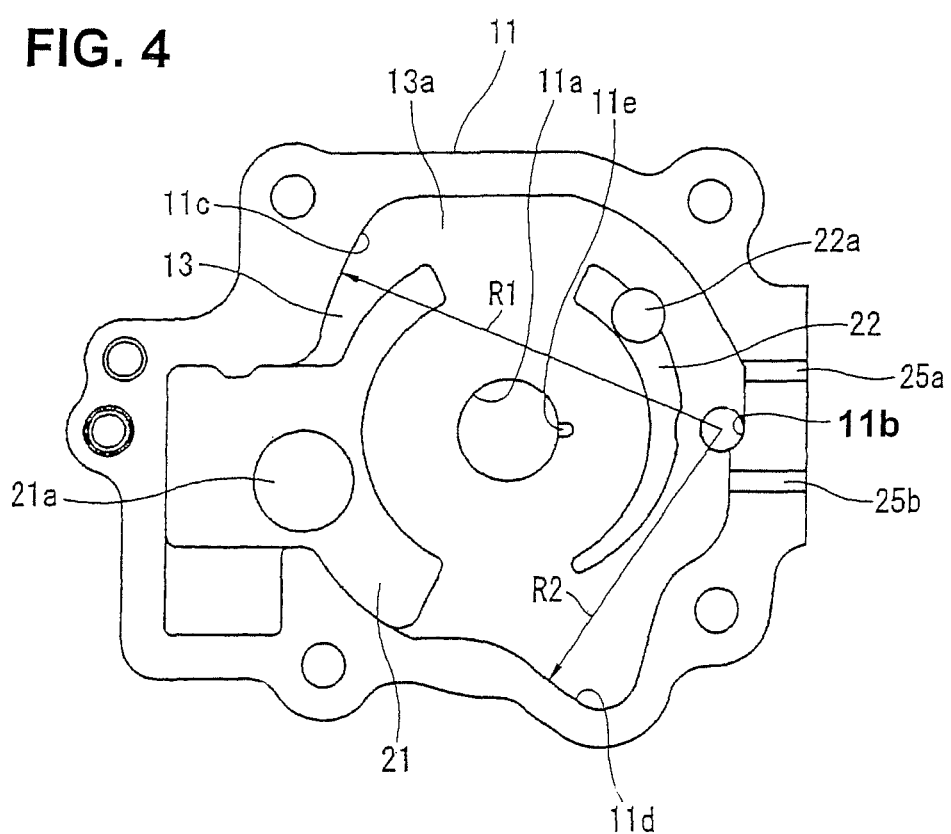
FIG. 4 is an elevation view illustrating the pump body of the oil pump of the first embodiment.

The aforementioned pump body 11 is integrally formed of aluminum alloy. As shown in FIGS. 3-4, a bearing hole 11a is configured to penetrate almost the center of a bottom face 13a of pump storage chamber 13, for rotatably supporting one end of drive shaft 14. As shown in FIG. 4, a support hole 11b is also formed at a given position of the inner peripheral wall of pump storage chamber 13, which wall corresponds to the side wall surface of pump body 11. A pivot pin 24, which is configured to pivotally support the cam ring 17, is inserted into and fixedly connected to the support hole 11b. By the way, an oil retention groove 11e is formed in the inner peripheral surface of the aforementioned bearing hole 11a, for retaining therein oil for lubrication of the drive shaft 14.

Furthermore, a first seal sliding-contact surface 11c and a second seal sliding-contact surface 11d are formed on the inner peripheral surface of pump storage chamber 13 and arranged on both sides, sandwiching a straight line M (hereinafter referred to as "cam ring reference line"), which line connects the center of bearing hole 11a and the center of support hole 11b. Seal members 30, 30 (described later), which are installed on the outer periphery of cam ring 17, are brought into sliding-contact with the respective seal sliding-contact surfaces. The first seal sliding-contact surface 11c is configured as a circular-arc shaped surface with the center of support hole 11b and a predetermined radius R1, whereas the second seal sliding-contact surface 11d is configured as a circular-arc shaped surface with the center of support hole 11b and a predetermined radius R2. Circumferential lengths of these seal sliding-contact surfaces are dimensioned such that seal members 30, 30 can be always kept in sliding-contact with the respective seal sliding-contact surfaces over the entire range of eccentric pivotal motion of cam ring 17. Hence, during the eccentric pivotal motion, cam ring 17 is guided to slide along the respective seal sliding-contact surfaces 11c, 11d, thereby ensuring smooth operation (smooth eccentric pivotal motion) of cam ring 17.

Figure 2:
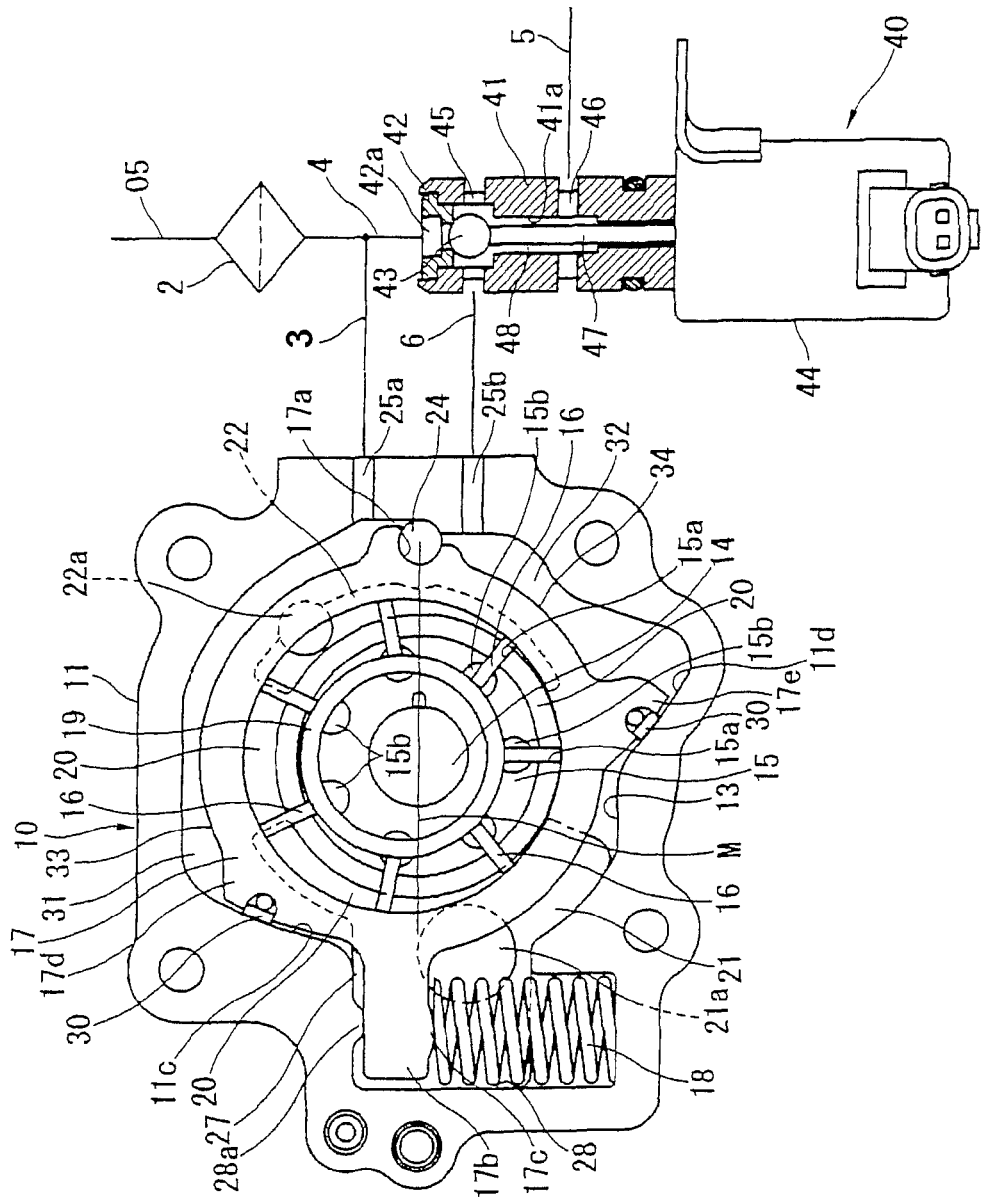
FIG. 2 is an entire schematic diagram of the variable-capacity oil pump of the first embodiment illustrating a maximum eccentricity state wherein the eccentricity of a cam ring reaches a maximum.

As shown in FIGS. 2 and 4, a suction port 21, which is a substantially circular-arc recessed suction part, and a discharge port 22, which is a substantially circular-arc recessed discharge part, are cut out and formed in the bottom face 13a of pump storage chamber 13 around the bearing hole 11a so as to be opposed to each other across the bearing hole 11a. The suction port is configured to open to an area (a suction area) that the internal volume of each pump chamber 20 increases with a pumping action of the pump elements, whereas the discharge port is configured to open to an area (a discharge area) that the internal volume of each pump chamber 20 decreases with the pumping action of the pump elements.

The aforementioned suction port 21 is formed with a suction hole 21a shaped to extend from almost the central position of suction port 21 toward a spring storage chamber 28 (described later) and configured to open to the exterior, penetrating the bottom wall of pump body 11. This permits lubricating oil stored in the oil pan 01 of the engine to be sucked into each pump chamber 20 in the suction area through the suction hole 21a and the suction port 21 due to a negative pressure produced by a pumping action of the pump elements.

By the way, the aforementioned suction hole 21a is configured to face the outer peripheral area of cam ring 17 belonging to the pump suction side, for introducing suction pressure into the outer peripheral area of the pump suction side of cam ring 17. Hence, the outer peripheral area of cam ring 17 belonging to the pump suction side and positioned adjacent to each pump chamber 20 in the suction area becomes a low-pressure part whose pressure is suction pressure or atmospheric pressure. This suppresses leakage of lubricating oil from each pump chamber 20 in the suction area toward the outer peripheral area of cam ring 17 belonging to the pump suction side.

The aforementioned discharge port 22 is formed with a discharge hole 22a formed at the upper position of the discharge port in FIG. 4 and configured to communicate with the main oil gallery 05 through the discharge flow path 04, penetrating the bottom wall of pump body 11.

With the previously-discussed configuration, oil, pressurized by a pumping action of the pump elements and discharged from each pump chamber 20 in the discharge area, is supplied to the main oil gallery 05 through the discharge port 22 and the discharge hole 22a, and then delivered into each sliding part of the engine, a valve timing control device, and the like.

The aforementioned cover member 12 is formed into a substantially plate shape. Part of the outside of the cover member, corresponding to the bearing hole 11a of pump body 11, is formed into a cylindrical shape. The inner peripheral surface of this cylindrical portion is formed as a bearing hole 12a (a through hole) by which the other end of drive shaft 14 is rotatably supported. Cover member 12 is mounted on the opening end face of pump body 11 by means of a plurality of bolts 26.

By the way, the inside face of cover member 12 is formed into a substantially flat shape, but in a similar manner to the bottom face of pump body 11 a suction port 21 and a discharge port 22 may be formed in the inside face of the cover member.

The aforementioned drive shaft 14 is configured to rotate the rotor 15 in a clockwise direction in FIG. 2 by torque transmitted from the crankshaft.

As shown in FIG. 2, the aforementioned rotor 15 is formed with seven slits 15a cut out to extend radially outward from the central portion of the rotor. Also formed at the innermost bottom end of each of slits 15a is a back pressure chamber 15b which has a substantially circular cross section and into which oil discharged into the discharge port 22 is introduced. Hence, each of vanes 16 is pushed or forced outward by the centrifugal force acting on ring members 19, 19 by rotation of rotor 15 and oil pressure in the respective back pressure chambers 15b.

The top end face of each of vanes 16 is kept in sliding-contact with the inner peripheral surface of cam ring 17. The innermost end face of the basal end of each of the vanes is also kept in sliding-contact with the outer peripheral surface of each of ring members 19, 19. Hence, even when engine speed is low and thus the previously-discussed centrifugal force and oil pressure in the back pressure chamber 15b are small, the outer peripheral surface of rotor 15, inside faces of adjacent vanes 16, 16, the inner peripheral surface of cam ring 17, the bottom face 13a of pump storage chamber 13 of pump body 11, which bottom face is the side wall surface, and the inside face of cover member 12 cooperate with each other to define each pump chamber 20 in a fluid-tight fashion.

The aforementioned cam ring 17 is integrally formed of sintered alloy and formed into a substantially annular shape. Also, the cam ring has a substantially circular-arc recessed pivot part 17a formed at a given position of the outer periphery so as to axially extend. The pivot part is contoured to provide or construct a fulcrum of eccentric pivotal-motion by fitting the pivot part onto the pivot pin 24. An arm part 17b is formed to protrude or extend from the opposite side of the pivot part 17a with respect to the center of cam ring 17 so as to be linked to the spring 18.

The spring storage chamber 28 is provided or defined in the pump body 11 so as to communicate with the pump storage chamber 13 through a communication part 27 formed at a position opposed to the support hole 11b. Spring 18 is installed in the spring storage chamber 28.

Spring 18 is elastically retained between the underside of the tip of arm part 17b, extending through the communication part 27 into the spring storage chamber 28, and the bottom face of spring storage chamber 28, under a preset load W. The underside of the tip of arm part 17b is formed with a substantially circular-arc shaped support protrusion 17c. One end of spring 18 is supported or retained by the support protrusion 17c.

Therefore, the previously-discussed spring 18 is configured to permanently bias the cam ring 17 via the arm part 17b in a direction in which the eccentricity of cam ring 17 increases (i.e., in a clockwise direction in FIG. 2) by an elastic force based on the preset load W. Hence, in an inoperative state of cam ring 17 shown in FIG. 2, cam ring 17 is kept in a spring-loaded state where the upside of arm part 17b is forced or pushed against a stopper part 28a, formed on the underside of the upper part of the peripheral wall of spring storage chamber 28, by the spring force of spring 18. Thus, the cam ring is kept in a spring-loaded position at which its eccentricity with respect to the rotation center of rotor 15 increases.

In this manner, the arm part 17b is arranged to extend on the opposite side of the pivot part 17a, and the tip of arm part 17b is biased by the spring 18. This facilitates the occurrence of a maximum torque acting on the cam ring 17. This also contributes to downsizing of the spring 18, thus ensuring downsizing of the pump itself.

A pair of seal structural parts, each having a substantially triangular lateral cross section, that is, a first seal structural part 17d and a second seal structural part 17e are formed to protrude from the outer periphery of cam ring 17 so as to be opposed to the first seal sliding-contact surface 11c and the second seal sliding-contact surface 11d, respectively. The first seal structural part and the second seal structural part are configured to have a first seal surface and a second seal surface, respectively. Also provided are a first seal retention groove and a second seal retention groove, each having a substantially rectangular lateral cross section, axially cut out and formed in the respective seal surfaces of seal structural parts 17d, 17e. The previously-discussed seal member pair, that is, seal members 30, 30, which are kept in sliding-contact with the respective seal sliding-contact surfaces 11c, 11d during eccentric pivotal motion of cam ring 17, are installed and retained in the respective seal retention grooves.

Hereupon, the previously-discussed seal surfaces are contoured by predetermined radii slightly less than respective radii R1, R2 by which the associated seal sliding-contact surfaces 11c, 11d are contoured, thereby defining slight clearance spaces C between the seal surfaces and the associated seal sliding-contact surfaces 11c, 11d.

For instance, each of seal members 30, 30 is made of a fluororesin-based material having a low friction property, and configured as a straight elongated member extending along the axial direction of cam ring 17. These seal members are configured to be forced or pushed against respective seal sliding-contact surfaces 11c, 11d by the elastic force of each rubber-made elastic member installed in the bottom of each of the seal retention grooves. This always ensures a good fluid-tight sealing performance for each of control oil chambers 31, 32 (described later).

As shown in FIG. 2, the first control oil chamber 31 and the second control oil chamber 32 are configured on the outer peripheral area of cam ring 17 belonging to the pump discharge side, that is, the side of pivot part 17a. The first control oil chamber and the second control oil chamber are defined between the outer peripheral surface of cam ring 17 and the inner peripheral surface of pump body 11 by the outer peripheral surface of cam ring 17, the pivot part 17a, the seal members 30, 30, and the inner peripheral surface of pump body 11, cooperating with each other. The first control oil chamber and the second control oil chamber are arranged on both sides across the pivot part 17a.

The first control oil chamber 31 is configured such that the pump discharge pressure of oil, discharged into the discharge port 22, is always introduced to the first control oil chamber through the main oil gallery 05, the first branch flow path 3, and a first communication hole 25a formed in a side part of pump body 11. A first pressure-receiving surface 33, which is constructed or defined by part of the outer peripheral surface of cam ring 17, facing the first control oil chamber 31, is configured to receive the oil pressure from the main oil gallery 05 so as to apply a force for pivotal motion (displacement) of cam ring 17 in the direction in which the eccentricity decreases (i.e., in an anticlockwise direction in FIG. 2) to the cam ring.

That is, the first control oil chamber 31 is configured to always bias the cam ring 17 in the direction such that the center of cam ring 17 and the center of rotor 15 concentrically approach to each other via the first pressure-receiving surface 33, that is, in the direction in which the eccentricity decreases. In other words, the first control oil chamber is used for displacement control in which a displacement of cam ring 17 in the concentric direction is controlled.

On the other hand, the second control oil chamber 32 is configured such that the discharge pressure in the second branch flow path 4 is appropriately introduced to the second control oil chamber through a second communication hole 25b by switching operation of electromagnetic directional switching valve 40 between ON and OFF. The second communication hole is formed to penetrate the side part of pump body 11 similarly to the first communication hole 25a and arranged parallel to the first communication hole.

Also, a second pressure-receiving surface 34, which is constructed or defined by part of the outer peripheral surface of cam ring 17, facing the second control oil chamber 32, is configured to receive a force, which acts in the direction for assisting of the biasing force of spring 18. That is, a force for pivotal motion (displacement) of cam ring 17 can be applied to the cam ring in the direction in which the eccentricity increases (i.e., in a clockwise direction in FIG. 2) by applying the discharge pressure against the second pressure-receiving surface.

As shown in FIG. 2, the pressure-receiving surface area S2 of the second pressure-receiving surface 34 is set to be less than the pressure-receiving surface area S1 of the first pressure-receiving surface 33. These pressure-receiving surfaces are configured such that a summed biasing force of a biasing force produced based on the internal pressure of the second control oil chamber 32 and a biasing force of spring 18, acting in an eccentric direction of cam ring 17, can be balanced in a given biasing-force relationship with a biasing force produced by the first control oil chamber 31. This allows the biasing force produced by the second control oil chamber 32 to assist the biasing force of spring 18. That is, the second control oil chamber 32 is configured to exert the discharge pressure, supplied via electromagnetic directional switching valve 40 as needed, on the second pressure-receiving surface 34, so as to appropriately assist the biasing force of spring 18. In other words, the second control oil chamber is used for displacement control in which a displacement of cam ring 17 in the eccentric direction is controlled.

The previously-discussed electromagnetic directional switching valve 40 is configured to operate responsively to an exciting current from the control unit (not shown) that controls the internal combustion engine, depending on the operating condition of the engine. Fluid-communication between the second branch flow path 4 and the second communication hole 25b can be appropriately established or blocked by means of the electromagnetic directional switching valve 40.

As shown in FIGS. 2 and 6, electromagnetic directional switching valve 40 is a three-way directional switching valve. The electromagnetic directional switching valve is press-fitted into a valve storage hole 35c formed in a sidewall of cylinder block 35 of the engine. The electromagnetic directional switching valve is mainly comprised of a valve body 41, a valve seat 42, a metal ball valve 43, and a solenoid unit 44. The valve body has an operation bore 41a formed to axially extend in the valve body. The valve seat is press-fitted into the top end of operation bore 41a and has a solenoid opening port 42a formed in its center so as to communicate with the downstream side of the second branch flow path 4. The metal ball valve is installed inside of the valve seat 42 such that movement of the ball valve away from and toward the valve seat is permitted for opening and closing the solenoid opening port 42a. The solenoid unit is provided at one axial end of valve body 41.

The aforementioned valve body 41 has a communication port 45 formed to radially penetrate the upper end of the peripheral wall of the valve body in a manner so as to communicate with the first branch flow path 3 through the solenoid opening port 42a. Also, the valve body has a drain port 46 formed to radially penetrate the lower end of the peripheral wall of the valve body in a manner so as to communicate with the operation bore 41a.

Although it is not clearly shown, the aforementioned solenoid unit 44 has an electromagnetic coil, a fixed iron core, a movable iron core and the like, all installed in the solenoid casing. A pushrod 47 is attached to the top stem end of the movable iron core so as to slide in the operation bore 41a with a specified radial clearance for applying a push (pressure) to the ball valve 43 via the tip of the pushrod or releasing the push.

An annular flow path 48 is defined between the outer peripheral surface of pushrod 47 and the inner peripheral surface of operation bore 41a, so as to appropriately establish fluid-communication between the communication port 45 and the drain port 46.

The aforementioned electromagnetic coil is designed to be switched between ON (an energized state) and OFF (a de-energized state) responsively to an ON signal or an OFF signal from the control unit of the engine.

That is, when an OFF (de-energization) signal from the control unit is outputted to the electromagnetic coil, the movable iron core moves backward (retracts) by the spring force of a return spring (not shown) and thus the push applied to the ball valve 43 via the pushrod 47 is released so as to open the solenoid opening port 42a. Therefore, as shown in FIG. 6, ball valve 43 moves backward by the discharge pressure introduced through the second branch flow path 4, and thus fluid-communication between the second branch flow path 4 and the supply-and-drain flow path 6 becomes established to supply the oil pressure to the second control oil chamber 32. At the same time, one opening end of annular flow path 48 is closed and thus fluid-communication between the communication port 45 and the drain port 46 by way of the annular flow path 48 becomes blocked.

In contrast, when an ON (energization) signal from the control unit is outputted to the electromagnetic coil, the movable iron core moves forward (advances) against the spring force of the return spring and thus the ball valve 43 is pushed via the pushrod 47. Therefore, as shown in FIG. 2, the solenoid opening port 42a is closed by the ball valve 43, and thus fluid-communication between the communication port 45 and the annular flow path 48 becomes established. Hence, the oil pressure in the second control oil chamber 32 is relieved due to the oil flow from the supply-and-drain flow path 6 through the communication port 45, the annular flow path 48, and the drain port 46 into the oil pan 01.

The previously-discussed control unit is configured to detect the current engine operating condition based on engine oil temperature or water temperature, engine speed, engine load and the like. In particular, when the engine speed is less than a predetermined engine speed value, the control unit outputs an ON (energization) signal to the electromagnetic coil of electromagnetic directional switching valve 40. Conversely when the engine speed exceeds the predetermined engine speed value, the control unit outputs an OFF (de-energization) signal to the electromagnetic coil.

However, when the engine speed is less than the predetermined engine speed value but the engine is operating in a high load range, an OFF signal is outputted to the electromagnetic coil such that oil pressure is supplied to the second control oil chamber 32.

With the previously-discussed configuration, the aforementioned oil pump 10 is configured to control the eccentricity of cam ring 17 by the relative force relationship between the applied forces acting on the cam ring 17, namely, the internal pressure of the first control oil chamber 31 to which oil pressure is always supplied from the main oil gallery 05, and the summed force of the biasing force of spring 18 and the internal pressure of the second control oil chamber 32 which pressure is regulated by the electromagnetic directional switching valve 40. Hence, the discharge pressure characteristic of oil pump 10 can be controlled by controlling the eccentricity and by controlling a variation of the internal volume of each pump chamber 20 (each operating oil chamber) during a pumping action.

[Operation of First Embodiment]

Figure 7:
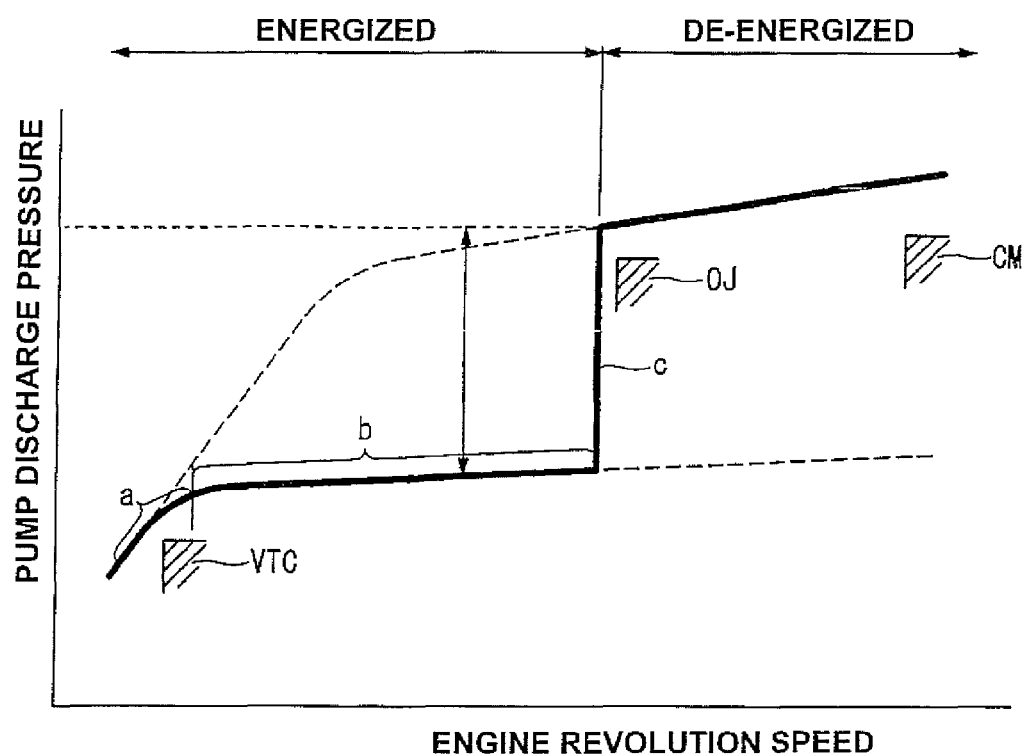
FIG. 7 is a graph illustrating the relationship between engine speed and oil pressure (discharge pressure) of the variable-capacity oil pump of the first embodiment.

The operation characterized by oil pump 10 of the first embodiment, that is, the pump discharge pressure control based on eccentricity control of cam ring 17 is hereunder explained in reference to the graph of FIG. 7 illustrating the relationship between engine speed and pump discharge pressure.

First, in a low speed range after starting the engine, an ON signal is outputted from the control unit to the electromagnetic coil of electromagnetic directional switching valve 40 and thus the switching valve becomes energized. Therefore, the discharge pressure, which is supplied to the main oil gallery 05 by driving the oil pump 10, is supplied through the first branch flow path 3 and the first communication hole 25a to the first control oil chamber 31. Additionally, as shown in FIG. 2, the ball valve 43 of electromagnetic directional switching valve 40 closes the solenoid opening port 42a due to a push of pushrod 47, and simultaneously establishes fluid-communication between the supply-and-drain flow path 6 and the annular flow path 48 such that the oil pressure in the second control oil chamber 32 is relieved due to the oil flow through the drain port 46 into the oil pan 01.

Therefore, as shown in FIG. 2, the arm part 17b of cam ring 17 is brought into abutted-engagement with the stopper part 28a by the spring force of spring 18 and thus the cam ring is held at an anticlockwise maximum rotational position. Under this condition, the eccentricity of cam ring 17, displaced with respect to the rotor 15, becomes a maximum, and thus a variation of the volume of each pump chamber 20 becomes a maximum. Hence, the oil pump becomes placed into a maximum capacity state. In this state, a rise of pump discharge pressure occurs, that is, the pump discharge pressure becomes such discharge pressure as indicated by the range "a" in FIG. 7. The discharge pressure is used as hydraulic pressure for hydraulically operating the valve timing control (VTC) device and also used for lubrication of each sliding part of the engine.

Figure 5:
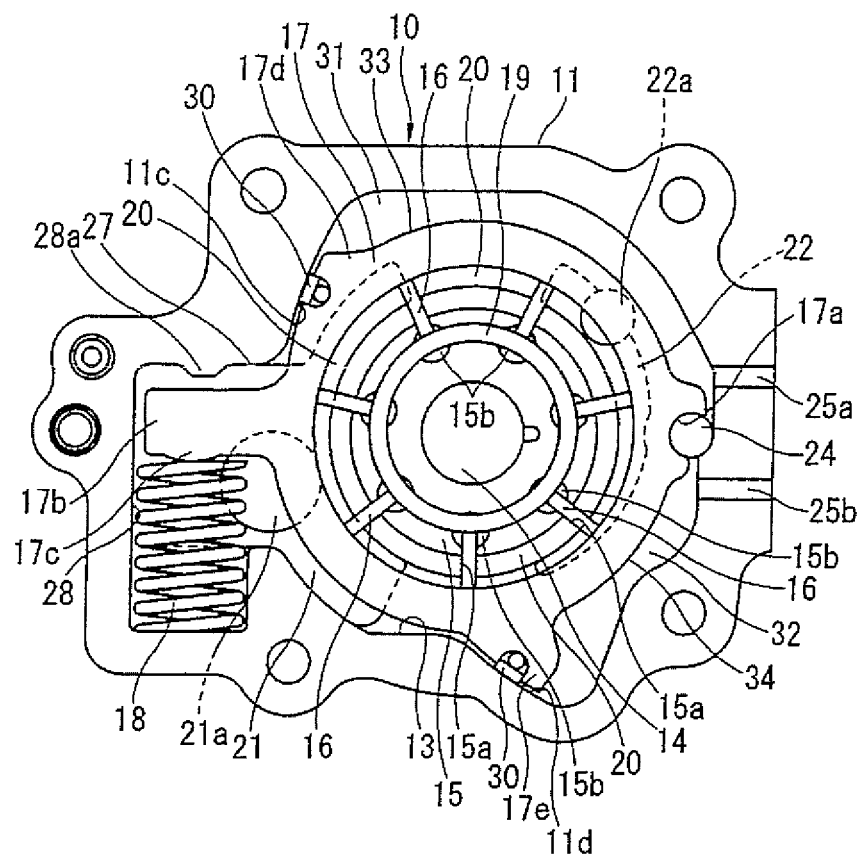
FIG. 5 is a schematic diagram of the oil pump of the first embodiment illustrating a minimum eccentricity state wherein the eccentricity of the cam ring reaches a minimum.

When the discharge pressure rises with an increase in engine speed, oil pressure, introduced from the main oil gallery 05 to the first control oil chamber 31, acts on the outer peripheral surface of cam ring 17, and serves as a force by which cam ring 17 is displaced anticlockwise, pivoting about the pivot pin 24 against the spring load of spring 18. FIG. 5 shows a state where cam ring 17 has been pivotally displaced anticlockwise. In this state, the center (the geometrical center) of the inside diameter of cam ring 17 approaches closer to the center of drive shaft 14 and thus the eccentricity decreases. Due to such a decrease in the eccentricity, a variation of the volume of each pump chamber 20 decreases and hence the pump capacity also decreases. At this time, the oil pressure characteristic of the engine becomes kept in a low pressure control state indicated by the range "b" in FIG. 7. The load (the preload) of spring 18 is set such that cam ring 17 begins to move when exceeding a required hydraulic pressure for a variable valve actuation device such as a VTC device.

Subsequently to the above, when the engine speed further increases and then reaches a predetermined revolution speed, an OFF signal is outputted from the control unit to the electromagnetic directional switching valve 40 and thus the switching valve becomes de-energized. As a result of this, as shown in FIG. 6, pushrod 47 moves backward and thus ball valve 43 moves backward by receiving the oil pressure from the second branch flow path 4 so as to open the solenoid opening port 42a, and simultaneously close the one opening end of annular flow path 48.

Hence, fluid-communication between the second branch flow path 4 and the supply-and-drain flow path 6 becomes established, thereby allowing introduction of the oil pressure in the main oil gallery 05 into the second control oil chamber 32. Accordingly, the oil pressure in the first control oil chamber 31 and the oil pressure in the second control oil chamber 32 become equal to each other.

Under these conditions, when the pump discharge pressure exceeds a predetermined hydraulic pressure value, cam ring 17 begins to move anticlockwise because of the previously-discussed greater pressure-receiving surface setting of the first control oil chamber 31. However, due to a hydraulic force produced by oil pressure introduced to both the control oil chambers and acting on the cam ring 17, less than a hydraulic force produced by oil pressure introduced to only the first control oil chamber 31, the hydraulic pressure level, at which cam ring 17 begins to move, becomes high.

At this time, the oil pressure characteristic becomes kept in a high pressure control state as indicated by the leading edge "c" in FIG. 7.

The spring load (the preload) of spring 18 and the pressure-receiving surface area ratio of the first control oil chamber 31 and the second control oil chamber 32 are set such that cam ring 17 begins to move when exceeding a valve-opening pressure for an oil jet (OJ) device or when exceeding a required hydraulic pressure for crankshaft bearings (CM).

Usually, the injection pressure of an oil jet device and the required hydraulic pressure for crankshaft bearings are required during high-speed operation. For this reason, during low speed operation of the engine, the oil pressure characteristic is kept in a low pressure control state by energizing the electromagnetic directional switching valve 40, for preventing a rise in oil pressure and for reducing power consumption. In contrast, during high speed operation, the oil pressure characteristic is switched to a high pressure control state by de-energizing the electromagnetic directional switching valve 40, for increasing the oil pressure up to a required level. In this manner, the oil pressure characteristic, indicated by the solid line in FIG. 7, can be obtained.

The previously-discussed engine speed threshold value needed for switching of electromagnetic directional switching valve 40 between energized and de-energized can be changed depending on an engine operating condition. The control unit is configured to determine this engine speed threshold value based on parameters, such as engine speed, engine load, oil temperature or water temperature and the like.

For instance, at high load operation or at high oil temperatures, the oil pressure characteristic is switched to a high pressure control state even under low speed. This permits oil-jet injection, thereby preventing knocking. Therefore, it is possible to phase-advance ignition timing, thus ensuring improved fuel economy. In contrast, at low oil temperatures, the oil pressure characteristic is maintained in a low-pressure control state, thereby reducing power consumption, and permitting oil jet injection to be stopped. This contributes to the shortened warm-up time and reduced hydrocarbon (HC) emissions.

By the way, under a high oil pressure control state in an engine high speed range, pulse pressure in the main oil gallery 05 tends to become great. When the pulse pressure acts on the first and second control oil chambers 31, 32, cam ring 17 vibrates and thus the pulsation of pump discharge pressure is multiplied. This leads to the problem such as occurrences of noise and vibrations.

Under a state where high oil pressure is supplied to both the first control oil chamber 31 and the second control oil chamber 32, pulse pressures act on both the control oil chambers together with the supplied oil pressures. Due to the summed pulse pressures, cam ring 17 vibrates and thus its position/movement tends to become unstable.

However, in the shown embodiment, the second oil filter 2 is disposed downstream of the junction of the first branch flow path 3 branched from the main oil gallery 05 and upstream of the branch point of the first branch flow path 3 and the second branch flow path 4. The pulsations of fluid flow upstream of the branch point can be dampened by a fluid resistance of the second oil filter 2.

As a result of this, it is possible to dampen or reduce pulse pressures in both the first control oil chamber 31 and the second control oil chamber 32 at the same level. In this manner, due to the pulse pressures in both the control oil chambers reduced at the same level, there is a less tendency for an unbalanced difference between the pulse pressure in the first control oil chamber 31 and the pulse pressure in the second control oil chamber 32 to occur. This ensures a stable movement of cam ring 17.

In case of a failure of electromagnetic directional switching valve 40 and the like, it is necessary to consider a failsafe function by which the pump discharge pressure can be shifted to a high pressure control state under an operating condition that the engine is operating at high engine speeds, high loads, and high oil temperatures.

That is to say, the failsafe system is configured to de-energize the electromagnetic coil for establishing fluid-communication between the solenoid opening port 42a and the communication port 45, in a manner so as to permit oil pressure to be introduced to the second control oil chamber 32 in the presence of a failure such as breaking of the coil and/or the harness of electromagnetic directional switching valve 40.

By the way, the second oil filter 2 is provided upstream of the electromagnetic directional switching valve 40. Hence, it is possible to prevent an operational failure of electromagnetic directional switching valve 40 from occurring due to the valve clogged with contaminants, and therefore it is possible to prevent fluid-communication between the second control oil chamber 32 and the drain flow path 5 from being undesirably established when de-energized.

Also, the first oil filter 1 is provided between the oil pump 10 and the main oil gallery 05, and therefore, usually, there is a less tendency for contaminants to flow into the main oil gallery 05 and the first branch flow path 3.

By the way, in the case of the first oil filter 1 with the bypass valve 09, the bypass valve becomes opened for protecting the engine, for instance when the first oil filter got clogged. At this time, there is a possibility that contaminants enter the first branch flow path 3.

However, there is a less possibility of the occurrence of clogging of the first oil filter 1 within a set replacing period. Hence, a non-replacing oil filter, which is downsized in comparison with the first oil filter 1, can be used as the second oil filter 2.

Also, the second oil filter 2 has only to capture contaminants, each of which has such size as to stick to the ball valve 43 within the electromagnetic directional switching valve 40 and which may result in a locked or sticking valve. For the reasons discussed above, it is possible to set the mesh size of the second oil filter greater than that of the first oil filter 1.

Assuming that the first oil filter 1 has been operated for a long period of time under a bypassed state and then the second oil filter 2 also got clogged, the fluid-flow path becomes blocked at the upstream side of the branch point of the first branch flow path 3 and the second branch flow path 4. This disables introduction of oil pressure to both the first control oil chamber 31 and the second control oil chamber 32.

In this case, the spring force of spring 18 returns the cam ring 17 to the spring-loaded position corresponding to the maximum eccentricity, and thus the pump is held at the maximum capacity state. Hence, it is possible to maintain a high oil pressure state.

As set forth above, a high oil pressure state can be secured irrespective of whether electromagnetic directional switching valve 40 is energized or de-energized. Even when a failure in electromagnetic directional switching valve 40 concurrently occurs, it is possible to maintain a high oil pressure state.

Additionally, as a countermeasure against excessively high oil pressure, check valve 07 can be operated for the purpose of suppressing damage to the oil pump 10 and/or respective components in the hydraulic circuit.

By the way, the first control oil chamber 31 and the second control oil chamber 32 are both arranged in close proximity to the discharge port 34, sandwiching the side-face clearances defined among the ring members 19, the pump body 11, and the cover member 12. Thus, when the high oil temperature condition has further continued, there is a possibility that oil is leaked or flown into both the first control oil chamber 31 and the second control oil chamber 32.

Due to the clogged second oil filter 2, oil tends to be flown into the suction side, serving as a low-pressure part, by way of the seal members 30, 30. However, due to a comparatively greater amount of inflow oil, both the oil pressure in the first control oil chamber 31 and the oil pressure in the second control oil chamber 32 tend to rise.

When electromagnetic directional switching valve 40 is in its de-energized state, the first control oil chamber 31 and the second control oil chamber 32 become communicated with each other by way of both the first branch flow path 3 and the supply-and-drain flow path 6. Accordingly, the oil pressure in the first control oil chamber and the oil pressure in the second control oil chamber become equal to each other. When the oil pressures in these control oil chambers rise up to the previously-discussed predetermined hydraulic pressure value from the same hydraulic pressure state, cam ring 17 begins to move. This enables or permits hydraulic-pressure control on the high-pressure side.

Furthermore, when the first oil filter 1 has clogged, the oil pressure in the main oil gallery 05 drops. Hence, the oil pressure in each of the first control oil chamber 31 and the second control oil chamber 32 tends to become higher than that in the main oil gallery 05. As a result, the oil flows from the first and second control oil chambers 31, 32 back to the main oil gallery 05, and therefore contaminants, with which the second oil filter 2 has clogged, can be once removed.

[Second Embodiment]

Figure 8:
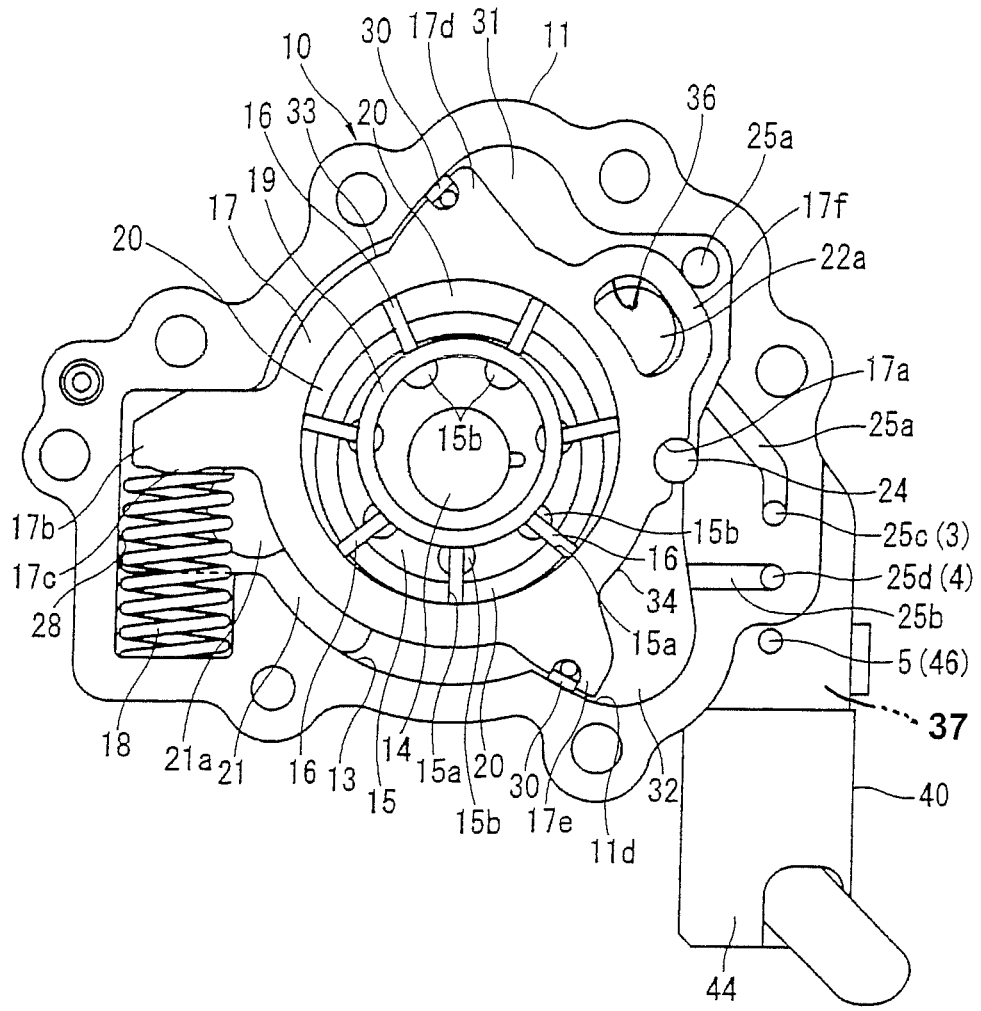
FIG. 8 is an elevation view of the oil pump of a second embodiment in a state wherein a cover member is removed.

FIG. 8 shows the second embodiment in which oil pump 10 and electromagnetic directional switching valve 40 are unified or integrated with each other. Regarding the oil pump 10, the outer periphery of cam ring 17 is formed integral with an annular protruding portion 17f having a communication hole 36. The communication hole 36 is configured to communicate with the discharge port 22 formed in the cover member 12 similarly to the pump body 11, so as to introduce the discharged oil into the discharge hole 22a.

The second embodiment uses the electromagnetic directional switching valve 40 having the same configuration as the first embodiment. Although it is not clearly shown, the valve body 41 is press-fitted into a valve storage hole (not shown) formed in a cylinder wall 37 integrally formed with the pump body 11. The first communication hole 25a and the second communication hole 25b, which are formed to communicate with the first control oil chamber 31 and the second control oil chamber 32 respectively, are configured as recessed grooves in the pump body 11 so as to construct or provide flow passages when assembling or attaching the cover member 12 onto the pump body 11.

Through holes 25c, 25d are formed at an end of the first communication hole 25a, facing apart from the first control oil chamber 31, and an end of the second communication hole 25b, facing apart from the second control oil chamber 32, and configured to penetrate into the cylinder wall 37 and communicate with the first branch flow path 3 and the communication port 45 of electromagnetic directional switching valve 40, respectively. Drain flow path 5 is formed in the cylinder wall 37 arranged outside of oil pump 10 so as to communicate with the drain port 46 of electromagnetic directional switching valve 40.

Figure 9:
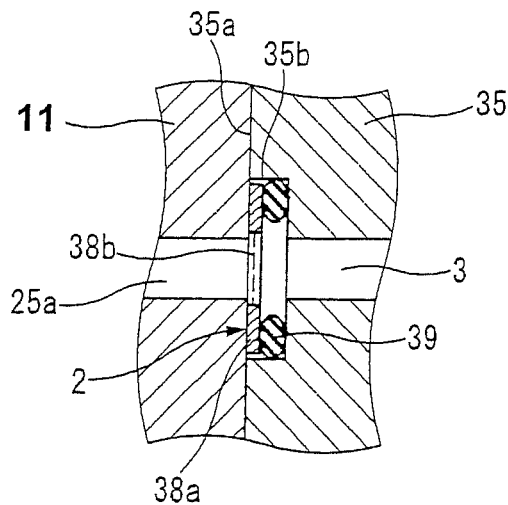
FIG. 9 is a cross-sectional view illustrating a state wherein a second oil filter is installed.

As shown in FIG. 9, the first communication hole 25a is configured to penetrate a mounting face 35a of cylinder block 35 at the bottom of the first control oil chamber 31 and provided to communicate with the first branch flow path 3. Also, the first branch flow path 3 is provided on the side of cylinder block 35 and configured to be substantially conformable to the same position as the first communication hole. A disk-shaped filter groove 35b is formed in the mating face of cylinder block 35 which is fitted onto the mating face of pump body 11 for retaining the second oil filter 2 in the filter groove.

Figure 10:
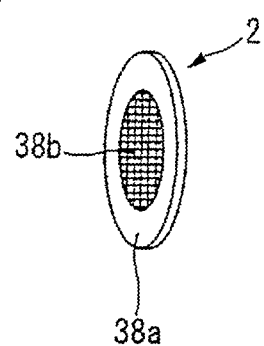
FIG. 10 is a perspective view of the second oil filter.

As shown in FIGS. 9-10, the second oil filter 2 of the second embodiment is comprised of an annular outer metal frame 38a and a metal mesh member 38b attached to the inside of the annular outer metal frame. As shown in FIG. 9, an O ring 39 is installed into the filter groove 35b for axially pushing the outer frame 38a of the second oil filter 2, thereby restricting movement of the second oil filter.

The other configurations of the second embodiment are the same as the first embodiment. Hence, the second embodiment can provide the same operation and effects as the first embodiment.

[Third Embodiment]

Figure 11:
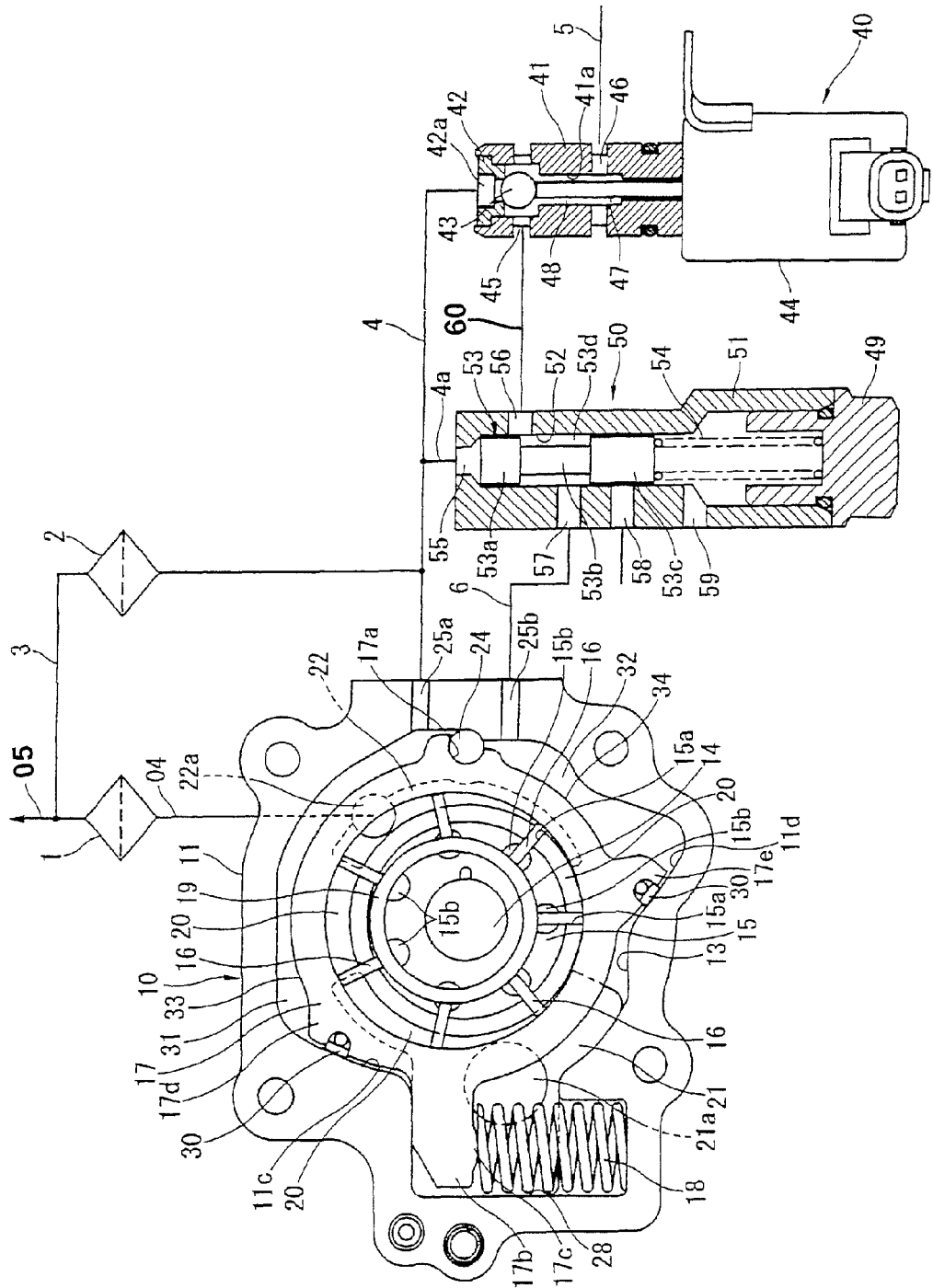
FIG. 11 is an entire schematic diagram of the variable-capacity oil pump of a third embodiment.
Figure 12:
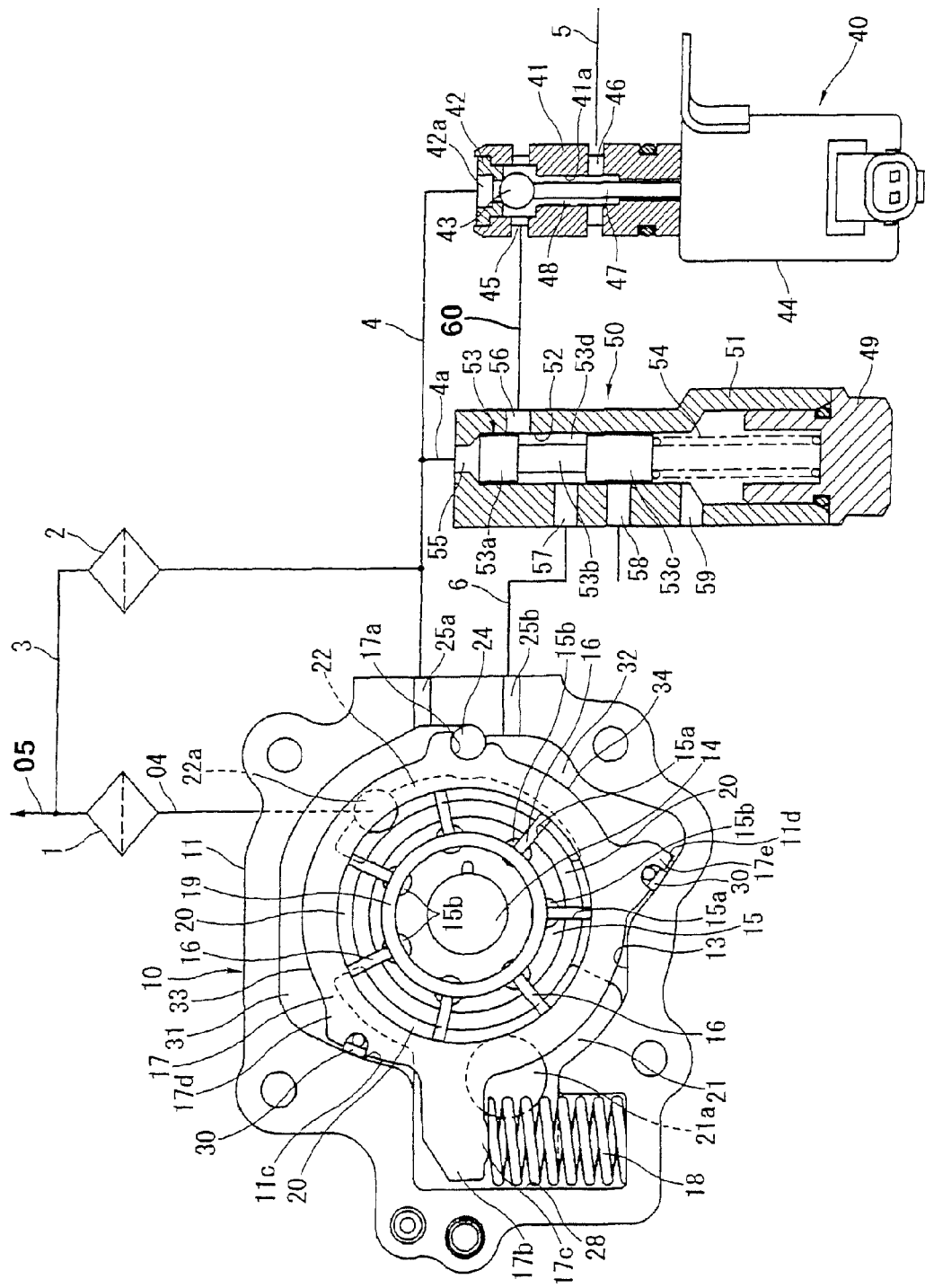
FIG. 12 is an explanatory drawing illustrating operation of the variable-capacity oil pump of the third embodiment.

FIGS. 11-12 show the third embodiment. In the third embodiment, the fundamental configuration and hydraulic pressure lines of oil pump 10 and electromagnetic directional switching valve 40 are the same as the first embodiment. The third embodiment differs from the first embodiment, in that in the third embodiment a pilot valve 50 is disposed in the supply-and-drain flow path 6 of electromagnetic directional switching valve 40. Thus, the same reference signs used to designate elements in the first embodiment will be applied to the corresponding elements used in the third embodiment, while detailed description of the same reference signs will be omitted because the above description thereon seems to be self-explanatory. In explaining the third embodiment, the system configuration is classified into three sections, that is, an upstream section "A" from the first branch flow path 3 to the electromagnetic directional switching valve 40, an intermediate section "B" from the electromagnetic directional switching valve 40 to the pilot valve 50, and a downstream section "C" from the pilot valve 50 to the oil pump 10.

Regarding the aforementioned pilot valve 50, its spool valve 53 is slidably installed in a sliding bore 52 of a valve body 51. Spool valve 53 is biased upward by a valve spring 54. The lower opening end of sliding bore 52 is hermetically closed by a plug 49. The aforementioned spool valve 53 is comprised of a first land portion 53a, a small-diameter shaft portion 53b, and a second land portion 53c, in order of an axial end facing apart from the valve spring 54. The diameters of the first land portion 53a and the second land portion 53c are dimensioned to be identical to each other. These land portions are configured to slide in the close-fitting inner peripheral surface of the sliding bore 52 with a very small clearance. An annular groove 53d is defined on the outer periphery of the aforementioned small-diameter shaft portion 53b.

A pilot pressure introduction port 55 is formed at the upper end of sliding bore 52 and configured to communicate with a branch portion 4a branched from the second branch flow path 4. The pilot pressure introduction port 55 is dimensioned to be less in inside diameter than the sliding bore 52, and additionally the cross section of this port is configured as a seating face on which the first land portion 53a seats by the spring force of valve spring 54 when there is no action of hydraulic pressure applied to the spool valve 53.

Opening ends of a connection port 56, a supply-and-drain port 57, a drain port 58, and a back pressure relief port 59 are formed in the inside face of sliding bore 52. The connection port is configured to communicate with the communication port 45 of electromagnetic directional switching valve 40 through an intermediate flow path 60. The supply-and-drain port is configured to communicate with the supply-and-drain flow path 6 configured to communicate with the second control oil chamber 32 through the second communication hole 25b.

The entire oil flow path configuration is hereunder described. On one hand, the downstream end of the second branch flow path 4 is configured to communicate with the solenoid opening port 42a of electromagnetic directional switching valve 40. On the other hand, the branch portion 4a, branched from the second branch flow path 4, is configured to communicate with the pilot pressure introduction port 55 of pilot valve 50.

Also, as discussed previously, one end of the aforementioned intermediate flow path 60 is connected to the communication port 45 of electromagnetic directional switching valve 40, whereas the other end of the intermediate flow path is connected to the connection port 56 of pilot valve 50. One end of supply-and-drain flow path 6 is connected to the supply-and-drain port 57 of pilot valve 50, whereas the other end of the supply-and-drain flow path is connected to the second communication hole 25b configured to communicate with the second control oil chamber 32 of oil pump 10.

Figure 15:
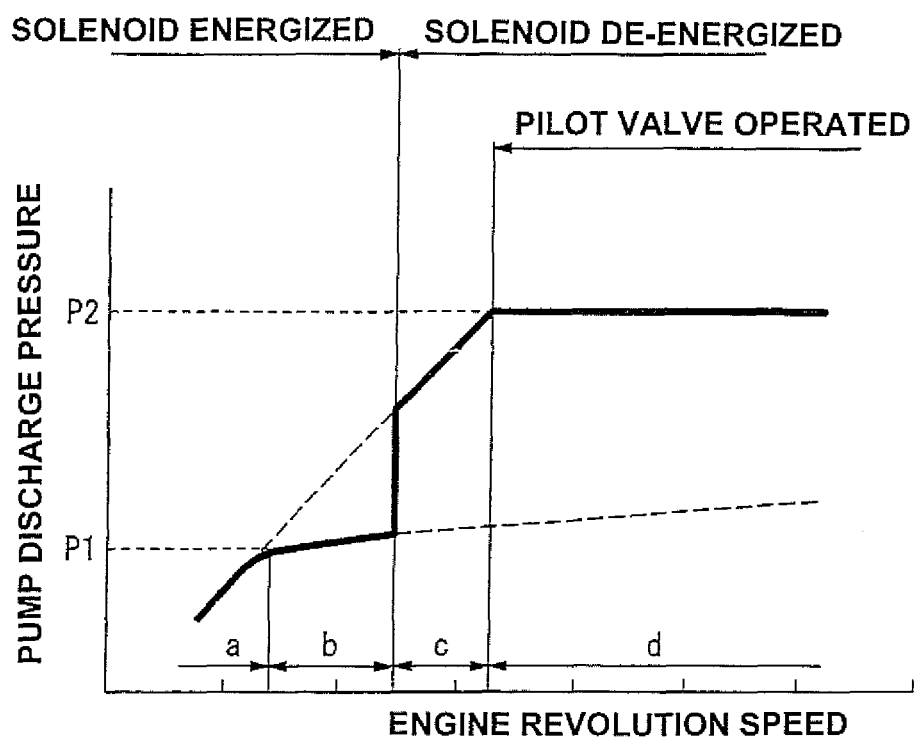
FIG. 15 is a graph illustrating the relationship between engine speed and hydraulic pressure (discharge pressure) of the variable-capacity oil pump of the third embodiment.

The operation of pilot valve 50 is hereunder described in reference to the oil pressure characteristic of FIG. 15. By the way, the operation of oil pump 10 and the operation of electromagnetic directional switching valve 40 are the same as the first embodiment.

FIG. 11 shows the pressure control state indicated by the speed range "a" in FIG. 15. Under this state, an ON signal is outputted from the control unit to the electromagnetic directional switching valve 40 and thus the switching valve becomes energized. Accordingly, fluid-communication between the communication port 45 and the drain port 46 becomes established. Owing to low engine speed, that is, low oil pressure, the first land portion 53a of spool valve 53 of pilot valve 50 is held seated on the previously-discussed seating face. At this time, the connection port 56 and the supply-and-drain port 57 are communicated with each other via the annular groove 53d defined on the outer periphery of small-diameter shaft portion 53b.

Under these conditions, oil pressure in main oil gallery 05 is introduced to the first control oil chamber 31. On the other hand, the second control oil chamber 32 is communicated with the drain port 46 of electromagnetic directional switching valve 40 via the pilot valve 50. Therefore, there is no supply of oil pressure to the second control oil chamber, but the eccentricity of cam ring 17 is still maintained at its maximum value, since the oil pressure in main oil gallery 05 is low. Hence, the oil pressure rises approximately in proportion to a rise in revolution speed.

When the oil pressure of main oil gallery 05 reaches a pressure level P1 indicated in FIG. 15, as shown in FIG. 12 cam ring 17 begins to move anticlockwise against the spring force of spring 18. Thus, the oil pressure characteristic of the engine becomes kept in a low pressure control state indicated by the engine speed range "b" in FIG. 15.

Figure 13:
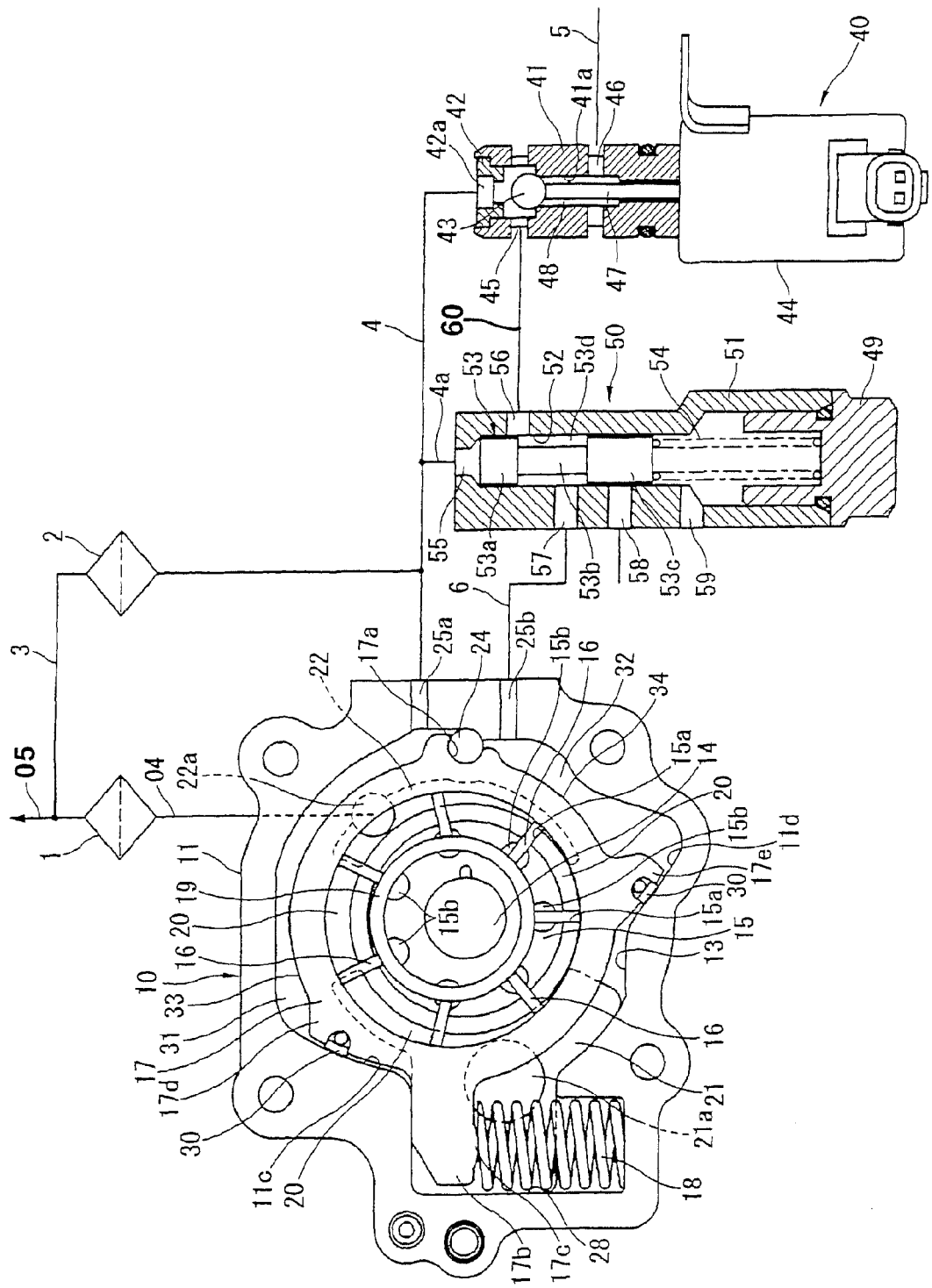
FIG. 13 is an explanatory drawing illustrating another operation of the variable-capacity oil pump of the third embodiment.

Conversely when the electromagnetic directional switching valve 40 becomes de-energized via the control unit, a transition to the pressure control state shown in FIG. 13 occurs. Regarding the side of electromagnetic directional switching valve 40, ball valve 43 moves backward, and thus fluid-communication between the solenoid opening port 42a and the communication port 45 becomes established. Regarding the side of pilot valve 50, spool valve 53 is still held seated or the spool valve 53 begins to move downward against the spring force of valve spring 54, but fluid-communication between the connection port 56 and the supply-and-drain port 57 is still maintained.

Therefore, oil pressure in main oil gallery 05 is also introduced to the second control oil chamber 32. Accordingly, the pump discharge pressure shifts to a high pressure control state as indicated by the leading edge in FIG. 15. Even after having switched to the high pressure control state, the pump discharge pressure does not yet reach a pressure level P2 within an engine speed range denoted by symbol "c" in FIG. 15, and thus the eccentricity of cam ring 17 returns back to its maximum value. Hence, the pump discharge pressure rises approximately in proportion to a rise in engine revolution speed.

When the pump discharge pressure reaches the pressure level P2, the spool valve 53 of pilot valve 50 begins to move downward against the spring force of valve spring 54 by hydraulic pressure acting at the pilot pressure introduction port 55.

Figure 14:
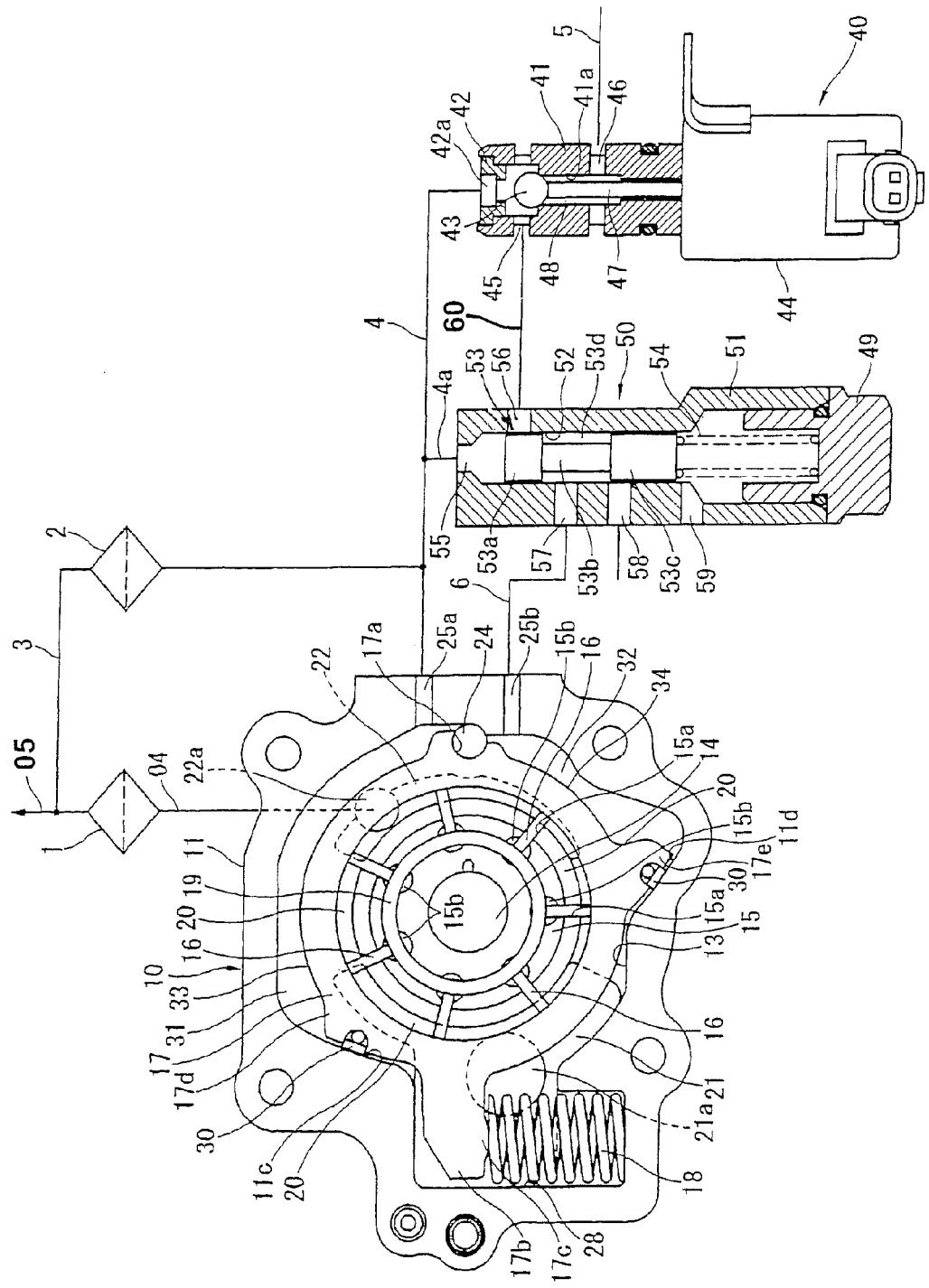
FIG. 14 is an explanatory drawing illustrating a further operation of the variable-capacity oil pump of the third embodiment.

When the pump discharge pressure becomes the pressure level P2, as shown in FIG. 14 the connection port 56 becomes closed by the first land portion 53a, and at the same time the drain port 58, which has been closed by the second land portion 53c, begins to open. Thus, fluid-communication between the supply-and-drain port 57 and the drain port 58 begins to be established. At this time, as seen in FIG. 4, the second control oil chamber 32 becomes communicated with the drain port 58. Hence, cam ring 17 moves in the direction in which the eccentricity decreases by hydraulic pressure in the first control oil chamber 31. Accordingly, the pump discharge pressure becomes a high pressure control state indicated by the engine speed range "d" in FIG. 15.

As an advantageous effect, by the use of pilot valve 50, it is possible to prevent an excessive oil pressure rise during the high pressure control mode for the pump discharge pressure.

That is, in the case that the pilot valve 50 is not equipped, as appreciated from the oil pressure characteristic of the first embodiment shown in FIG. 7, the oil pressure tends to rise with an increase in engine speed during hydraulic pressure control. This is because it becomes necessary to further reduce the eccentricity of cam ring 17 with an increase in engine speed. However, at this time, the oil pressure has to be risen by a stroke of spring 18 having a spring stiffness.

Regarding the side of pilot valve 50, when an excessive drop in pump discharge pressure occurs, spool valve 53 moves upward (toward its seat), thereby establishing fluid-communication between the connection port 56 and the supply-and-drain port 57. As a result, oil pressure is introduced to the second control oil chamber 32, and thus the eccentricity of cam ring 17 is controlled to the eccentricity-increasing direction and a rise in the oil pressure occurs.

When the oil pressure has excessively risen, spool valve 53 begins to move downward against the spring force of valve spring 54, thereby establishing fluid-communication between the drain port 58 and the supply-and-drain port 57. As a result, the oil pressure in the second control oil chamber 32 is reduced, and thus the eccentricity of cam ring 17 is controlled to the eccentricity-decreasing direction and a drop in the oil pressure occurs. These eccentricity control modes can be controlled by a very small displacement of spool valve 53. The influence of valve spring 54 is negligible, and thus the oil pressure can be controlled to approximately the pressure level P2 as indicated in FIG. 15.

In the third embodiment, pilot valve 50 also serves to switch from either one of the connection port 56 and the drain port 58 to the other as a port to be connected to the supply-and-drain port 57. In lieu thereof, the pilot valve may be configured to bring about a transient flow-path state where these flow path configurations are both established concurrently. Also, the pilot valve may be configured to bring about a transient flow-path state where these flow path configurations are both blocked concurrently. The borders among the first land portion 53a, the small-diameter shaft portion 53b, and the second land portion 53c may be configured to be chamfered or rounded. These are factors that alter valve characteristics of spool valve 53, such as a valve stroke, opening areas and the like, during switching operation. These factors are adjusted, taking into account pump capacities and switching pressure.

Timing of switching of electromagnetic directional switching valve 40 between energization (ON) and de-energization (OFF) is determined by the control unit depending on the engine operating condition. The timing of switching is not limited to such timing (such switching order) as indicated in FIG. 15. In lieu thereof, the timing of switching may be determined such that a transition from a state corresponding to the engine speed range "a" to a state corresponding to the engine speed range "c" occurs or a transition from a state corresponding to the engine speed range "b" to a state corresponding to the engine speed range "d" occurs.

The object and effects of the first oil filter 1 and the second oil filter 2 and the failsafe method are the same as the first embodiment. That is, when undesirable clogging of the second oil filter 2 and a failure of electromagnetic directional switching valve 40 (an undesirable de-energized state due to breaking of the harness) have occurred concurrently, there is a less introduction of oil pressure to the pilot pressure introduction port 55 of pilot valve 50. As a result, spool valve 53 becomes held seated. Thus, fluid-communication between the connection port 56 and the supply-and-drain port 57 becomes established. Hence, the third embodiment can provide the same failsafe mode as the first embodiment in which the pilot valve 50 is not equipped.

Moreover, the second oil filter 2 is disposed upstream of the pilot valve 50. Hence, pulse pressures are reduced or dampened by a resistance of the second oil filter 2, and then the reduced pulse pressures act on the pilot valve 50, thereby reducing the valve vibration.

[Fourth Embodiment]

Figure 16:
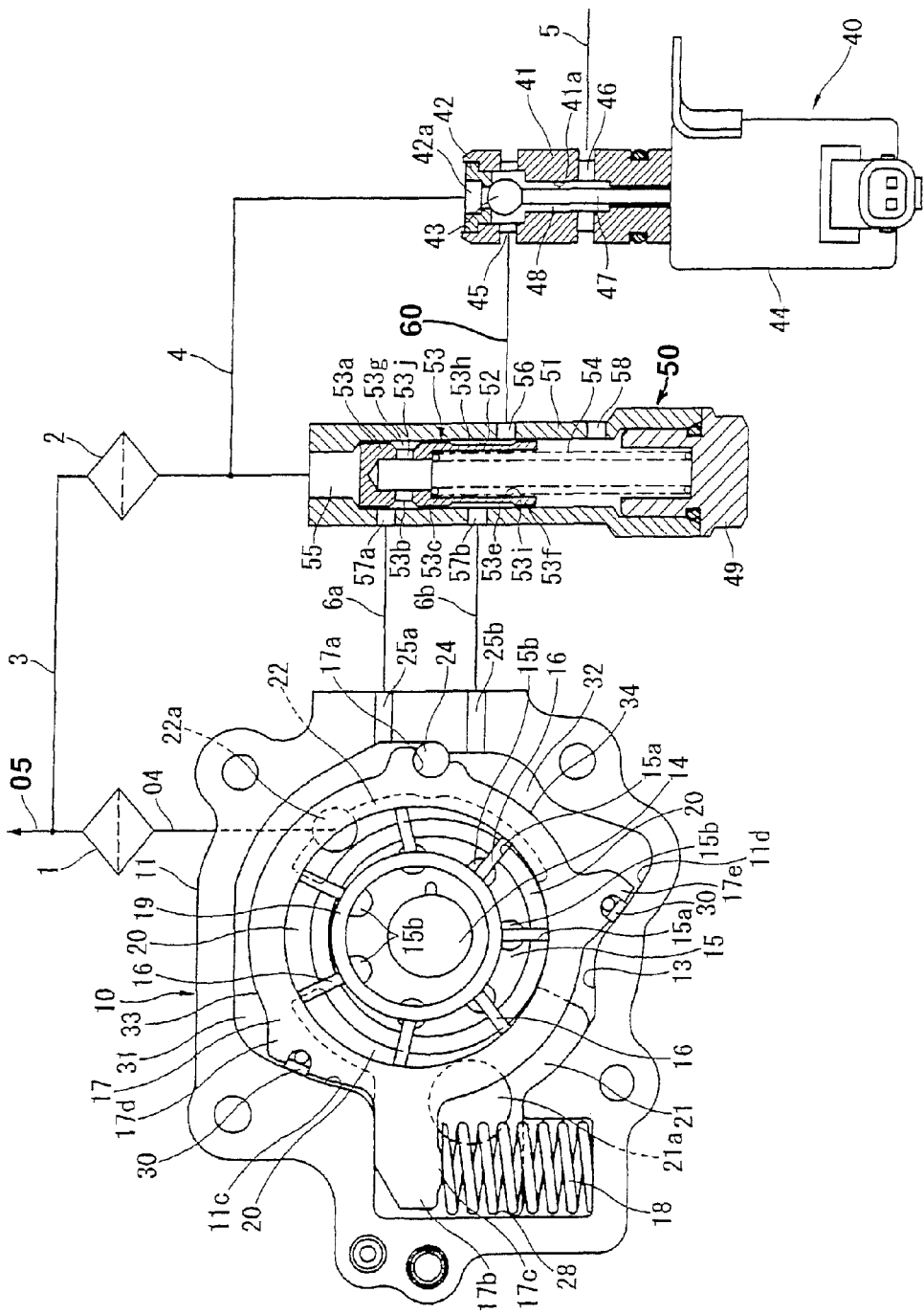
FIG. 16 is an entire schematic diagram of the variable-capacity oil pump of a fourth embodiment.
Figure 20:
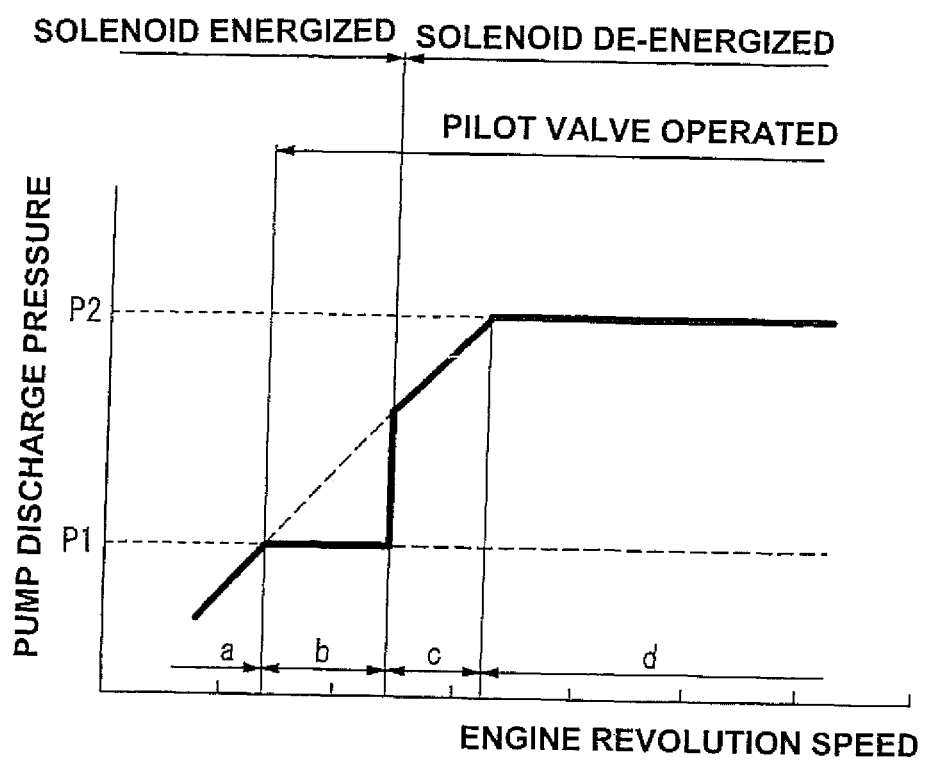
FIG. 20 is a graph illustrating the relationship between engine speed and hydraulic pressure (discharge pressure) of the variable-capacity oil pump of the fourth embodiment.

FIG. 16 shows the fourth embodiment. FIG. 20 shows the oil pressure characteristic of the fourth embodiment. In the fourth embodiment, switching of oil pump 10 between low pressure control and high pressure control is controlled by the use of the pilot valve 50. That is, the single pilot valve also serves as a low/high pressure control valve.

The fundamental hydraulic pressure lines are configured to lead from the oil pump 10 through the discharge flow path 04 and the first oil filter 1 to the main oil gallery 05. The flow path configuration that leads from the first branch flow path 3 branched from the main oil gallery 05 via the second oil filter 2 to the first and second communication holes 25a, 25b is the same as the first embodiment and the third embodiment.

Although other flow path configurations, including the relief flow path 06 and the bypass flow path 08, are not shown in the drawings associated with the fourth embodiment, these flow path configurations are provided at the same locations as the hydraulic circuit diagram of FIG. 1.

In a similar manner to the third embodiment, In explaining the fourth embodiment, the system configuration is classified into three sections, that is, an upstream section "A" from the branch point of the first branch flow path to the electromagnetic directional switching valve 40, an intermediate section "B" from the electromagnetic directional switching valve 40 to the pilot valve 50, and a downstream section "C" from the pilot valve 50 to the oil pump 10.

Additionally, the pilot valve 50 is interleaved in the middle of the first branch flow path 3. Thus, in explaining the fourth embodiment, the system configuration is further classified into an upstream section upstream of the pilot valve 50 and a downstream section downstream of the pilot valve.

Regarding the aforementioned pilot valve 50, its spool valve 53 is slidably installed in the sliding bore 52 of valve body 51. The lower opening end of the sliding bore is hermetically closed by the plug 49 under a preloaded state where the spool valve is biased or forced by the spring load of valve spring 54.

Spool valve 53 is formed into a substantially cylindrical shape. The spool valve is formed with a flow-path hole 53i, which is bored in the spool valve and in which part of valve spring 54 is accommodated. The spool valve is formed into a stepped shape, and comprised of the first land portion 53a, the first small-diameter shaft portion 53b, the second land portion 53c, a second small-diameter shaft portion 53e, and a third land portion 53f, in that order from the side of pilot pressure introduction port 55.

The diameters of the first land portion 53a, the second land portion 53c, and the third land portion 53f are dimensioned to be identical to each other. These land portions are configured to slide in the sliding bore 52 with a very small clearance. A first annular groove 53g and a second annular groove 53h are defined on the respective outer peripheries of the first small-diameter shaft portion 53b and the second small-diameter shaft portion 53e. The first annular groove 53g of the first small-diameter shaft portion 53b is configured to communicate with the sliding bore 52 and the connection port 56 through a through hole 53j, formed to radially penetrate the spool valve, by way of the flow-path hole 53i.

The pilot pressure introduction port 55 is formed at the upper end opposed to the lower opening end of sliding bore 52, and configured to have an inside diameter less than the inside diameter of sliding bore 52. The stepped or shouldered section of them is configured as a seating face on which the spool valve seats when there is no action of hydraulic pressure applied to the spool valve 53.

A first supply-and-drain port 57a, a second supply-and-drain port 57b, and the drain port 58 are formed in the inside face of sliding bore 52. The first supply-and-drain port is configured to communicate with the first control oil chamber 31 through a first supply-and-drain flow path 6a. The second supply-and-drain port is configured to communicate with the second control oil chamber 32 through a second supply-and-drain flow path 6b. The drain port 58 is configured to also serve as a back pressure relief port.

The first branch flow path 3, branched from the main oil gallery 05, is configured to communicate with the pilot pressure introduction port 55 of pilot valve 50 through the second oil filter 2. Also, the second branch flow path 4, branched from the first branch flow path 3, is configured to communicate with the solenoid opening port 42a of electromagnetic directional switching valve 40.

The intermediate flow path 60 is configured to connect the communication port 45 of electromagnetic directional switching valve 40 and the connection port 56 of pilot valve 50.

The first supply-and-drain flow path 6a is configured to connect the first supply-and-drain port 57a of pilot valve 50 and the first communication hole 25a of oil pump 10. The second supply-and-drain flow path 6b is configured to connect the second supply-and-drain port 57b of pilot valve 50 and the second communication hole 25b of oil pump 10.

The operation of pilot valve 50 is hereunder described in reference to the oil pressure characteristic of FIG. 20. By the way, the operation of oil pump 10 and the operation of electromagnetic directional switching valve 40 are the same as the first embodiment and the third embodiment.

FIG. 16 shows the pressure control state indicated by the speed range "a" in FIG. 20. Under this state, the electromagnetic directional switching valve 40 becomes energized. Accordingly, fluid-communication between the communication port 45 and the drain port 46 becomes established. Owing to low engine speed, that is, low oil pressure, the spool valve 53 of pilot valve 50 is held seated on the previously-discussed seating face by the spring force of valve spring 54. At this time, the first control oil chamber 31 is communicated with the drain port 58 by way of the first supply-and-drain flow path 6a and the first supply-and-drain port 57a, the first annular groove 53g, the through hole 53j, and the flow-path hole 53i. The second control oil chamber 32 is communicated with the communication port 45 of electromagnetic directional switching valve 40 by way of the second supply-and-drain flow path 6b and the second annular groove 53h via the connection port 56, and further communicated with the drain flow path 5 through the drain port 46.

Accordingly, the first control oil chamber 31 and the second control oil chamber 32 are communicated with the drain ports 58 and 46, respectively. Therefore, there is no introduction of oil pressure to these control oil chambers, and thus the eccentricity of cam ring 17 is maintained at its maximum value by means of spring 18. Hence, the oil pressure rises approximately in proportion to a rise in revolution speed.

Figure 17:
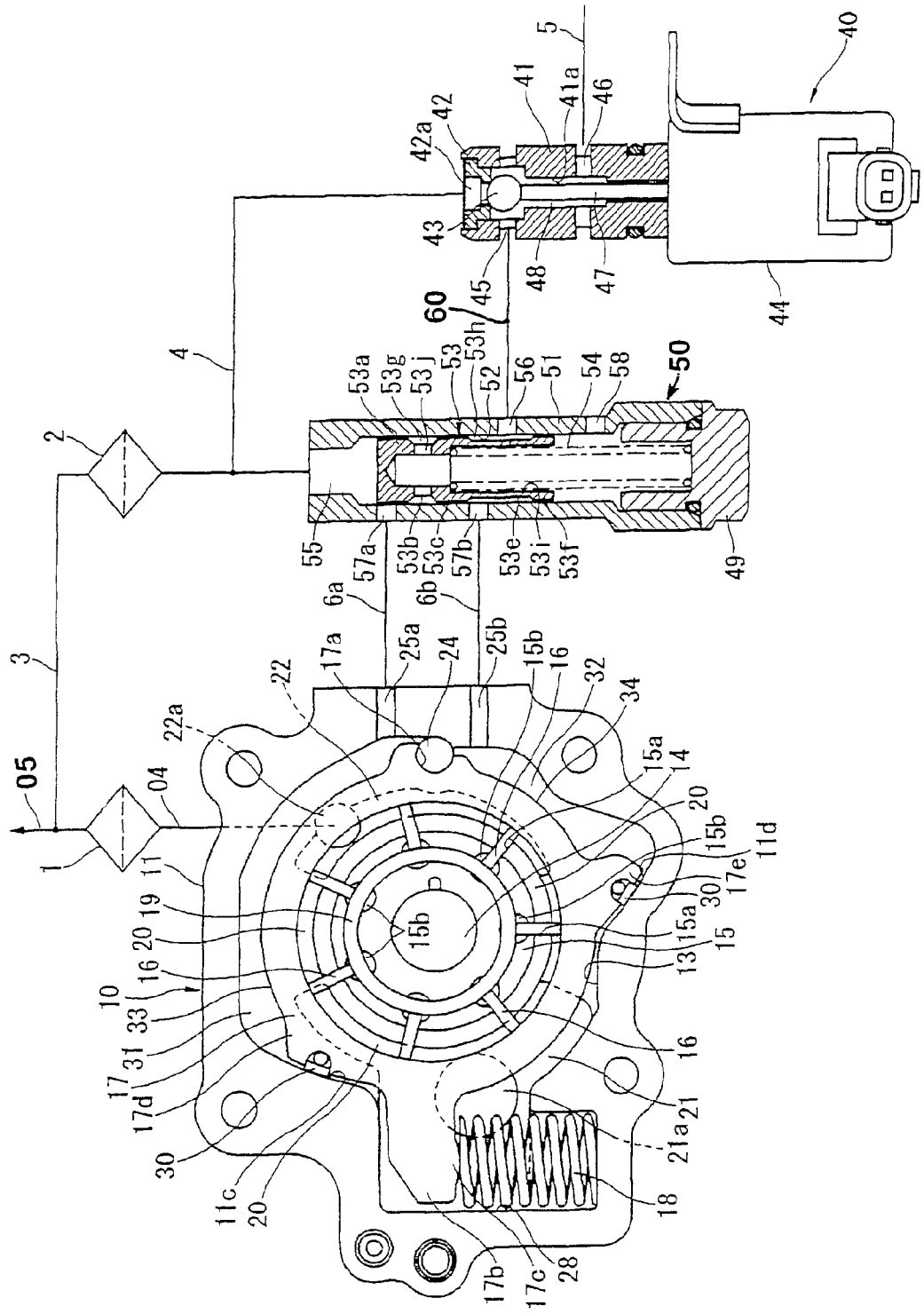
FIG. 17 is an explanatory drawing illustrating operation of the variable-capacity oil pump of the fourth embodiment.

When the oil pressure of main oil gallery 05 reaches a pressure level P1, the oil pressure is introduced through the pilot pressure introduction port 55 of pilot valve 50 and acts on the first land portion 53a of spool valve 53. Thus, the spool valve downwardly moves to the position shown in FIG. 17 against the spring force of valve sprig 54. Due to the downward movement of spool valve 53, fluid-communication between the pilot pressure introduction port 55 and the first supply-and-drain port 57a becomes established, but fluid-communication between the first supply-and-drain port and the drain port 58 becomes blocked. Therefore, oil pressure is introduced into the first control oil chamber 31. As a result, cam ring 17 begins to move anticlockwise against the spring force of spring 18. Thus, the oil pressure characteristic of the engine becomes kept in a low pressure control state indicated by the engine speed range "b" in FIG. 20.

Even under such a low pressure control state, in the case that the pilot valve 50 is not equipped, as appreciated from the oil pressure characteristic of the first embodiment shown in FIG. 7, the oil pressure tends to rise with an increase in engine speed during hydraulic pressure control. According to the fourth embodiment, by the use of pilot valve 50, even during the low pressure control mode, it is possible to prevent an excessive oil pressure rise in the same manner as during the high pressure control mode.

Regarding the side of pilot valve 50, when an excessive drop in oil pressure occurs, spool valve 53 moves toward its seat, thereby blocking fluid-communication between the pilot pressure introduction port 55 and the first supply-and-drain port 57a and simultaneously establishing fluid-communication between the first supply-and-drain port 57a and the drain port 58. As a result, the oil pressure in the first control oil chamber 31 is reduced, and thus the eccentricity of cam ring 17 is controlled to the eccentricity-increasing direction and a rise in the oil pressure occurs.

When the oil pressure has excessively risen, spool valve 53 begins to move toward the lower opening end, that is, toward the plug 49 against the spring force of valve spring 54, thereby establishing fluid-communication between the pilot pressure introduction port 55 and the first supply-and-drain port 57a. As a result, oil pressure is introduced to the first control oil chamber 31, and thus the eccentricity of cam ring 17 is controlled to the eccentricity-decreasing direction and a drop in the oil pressure occurs.

These eccentricity control modes can be controlled by a very small displacement of spool valve 53. The influence of valve spring 54 is negligible, and thus the oil pressure can be controlled to approximately the pressure level P1.

Figure 18:
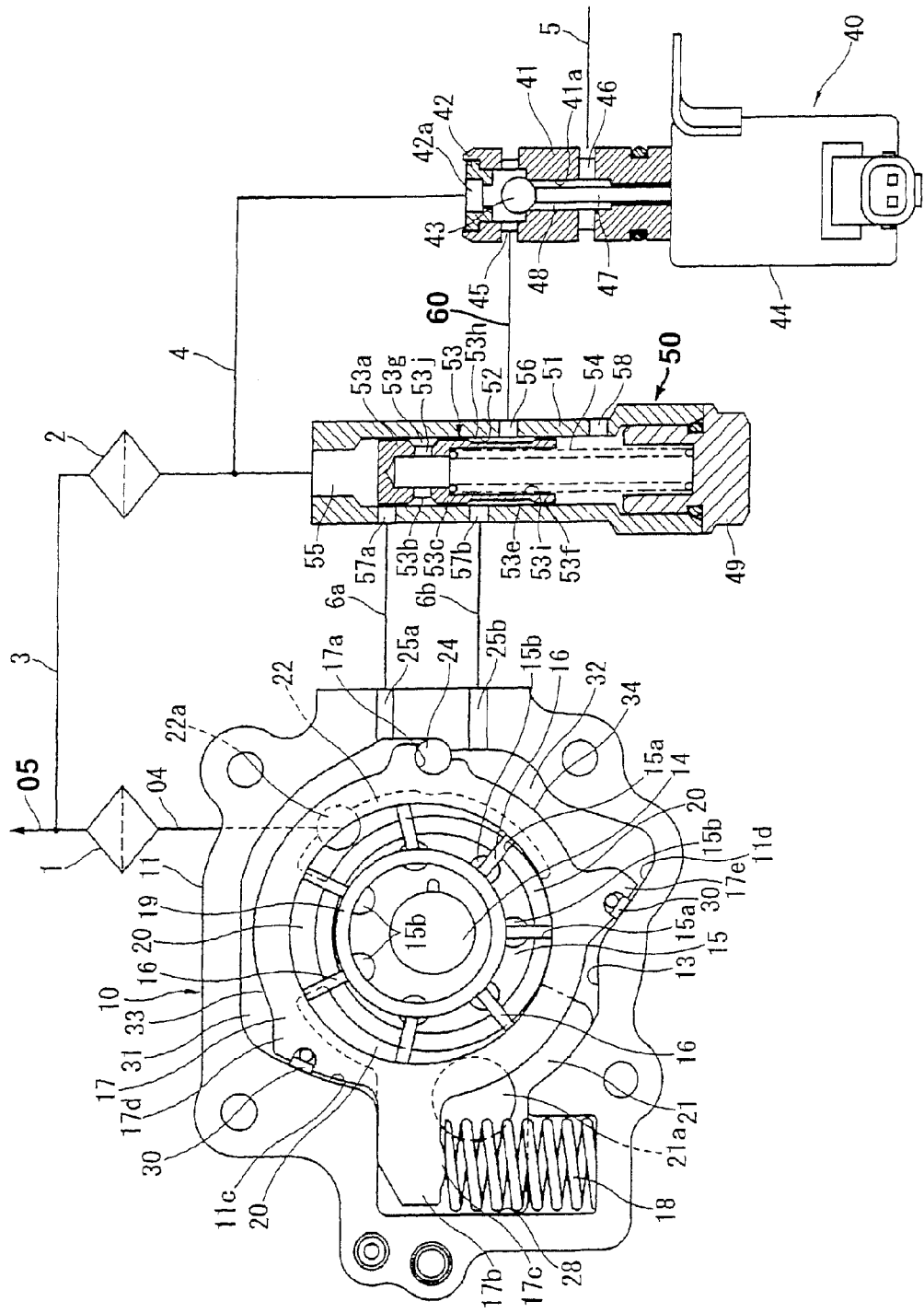
FIG. 18 is an explanatory drawing illustrating another operation of the variable-capacity oil pump of the fourth embodiment.

Conversely when the electromagnetic directional switching valve 40 becomes de-energized, a transition to the pressure control state shown in FIG. 18 occurs. Regarding the side of electromagnetic directional switching valve 40, fluid-communication between the solenoid opening port 42a and the communication port 45 becomes established. Regarding the side of pilot valve 50, spool valve 53 moves toward the plug 49 against the spring force of valve spring 54 and becomes displaced to a given position, at which fluid-communication between the pilot pressure introduction port 55 and the first supply-and-drain port 57a becomes established, but fluid-communication between the connection port 56 and the second supply-and-drain port 57b is still maintained.

Therefore, oil pressure in main oil gallery 05 is introduced to both the first control oil chamber 31 and the second control oil chamber 32. Accordingly, the oil pressure shifts to a high pressure control state as indicated by the leading edge in FIG. 20. Even after having switched to the high pressure control state, the oil pressure does not yet reach a pressure level P2 within an engine speed range denoted by symbol "c" in FIG. 20, and thus the eccentricity of cam ring 17 returns back to its maximum value. Hence, the oil pressure rises approximately in proportion to a rise in engine revolution speed.

Figure 19:
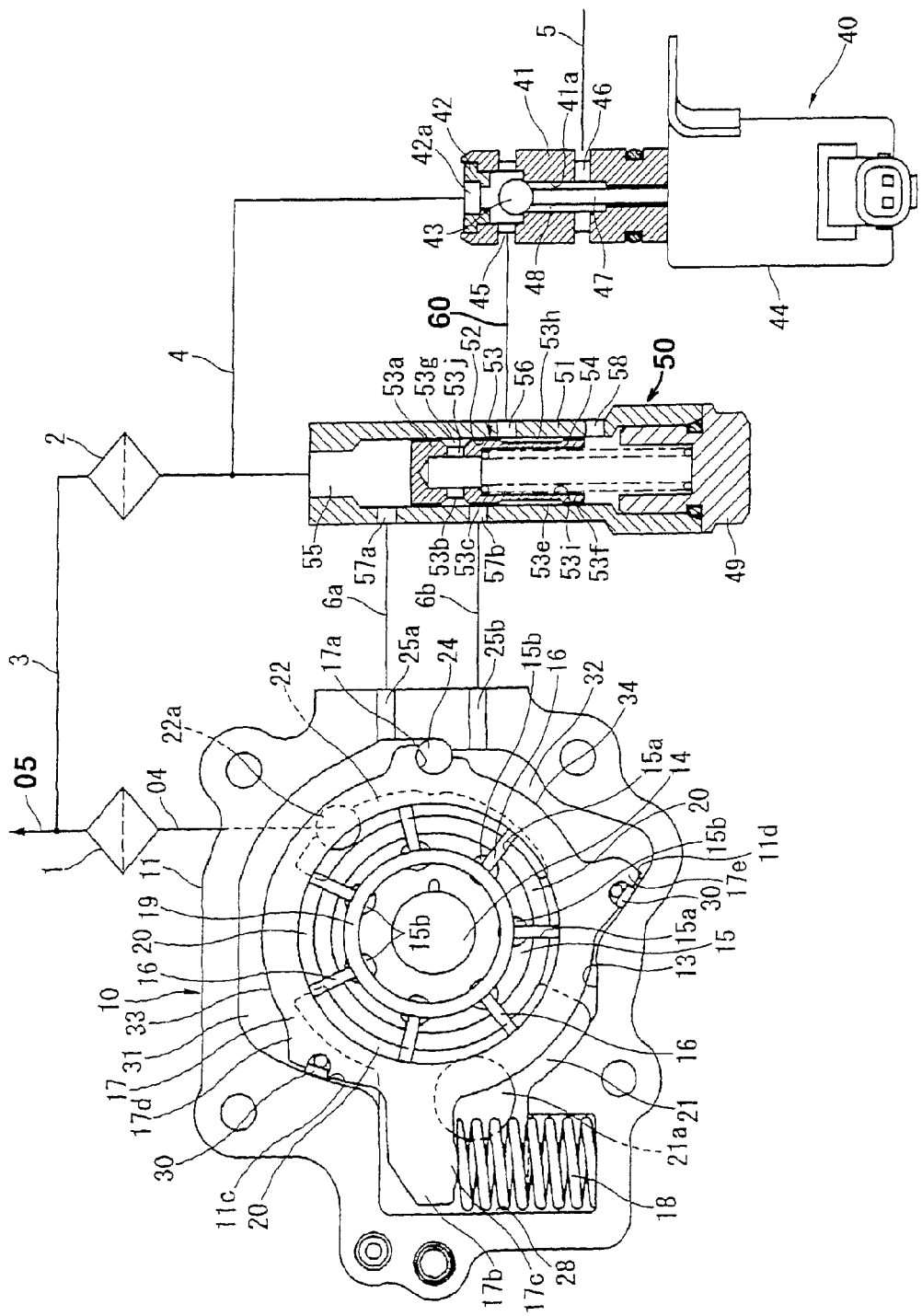
FIG. 19 is an explanatory drawing illustrating a further operation of the variable-capacity oil pump of the fourth embodiment.

When the pump discharge pressure reaches the pressure level P2, as shown in FIG. 19 the spool valve 53 of pilot valve 50 further moves toward the plug 49 against the spring force of valve spring 54 by hydraulic pressure acting at the pilot pressure introduction port 55. Therefore, fluid-communication between the connection port 56 and the second supply-and-drain port 57b becomes blocked. At the same time, the second supply-and-drain port 57b begins to be communicated with the first annular groove 53b, and also communicated with the drain port 58 through the flow-path hole 53i. Thus, fluid-communication between the second supply-and-drain port 57b and the drain port 58 begins to be established.

At this time, as seen in FIG. 19, the second control oil chamber 32 becomes communicated with the drain port 58. Hence, cam ring 17 moves in the direction in which the eccentricity decreases. Accordingly, the oil pressure becomes a high pressure control state indicated by the engine speed range "d" in FIG. 20.

The advantageous operation and effect of pilot valve 50 in which it is possible to prevent an excessive oil pressure rise during the high pressure control mode and its principle are the same as the third embodiment.

In the fourth embodiment, port-switching timing of the first land portion 53a and port-switching timing of the second land portion 53c are concurrently timed. In lieu thereof, the port-switching timings of the land portions may be designed to bring about a transient flow-path state where these flow path configurations are both established concurrently. Also, the port-switching timings of the land portions may be designed to bring about a transient flow-path state where these flow path configurations are both blocked concurrently. The borders among the first land portion 53a, the shaft portion 53b, and the second land portion 53c may be configured to be chamfered or rounded. These are factors that alter valve characteristics of spool valve 53, such as a valve stroke, opening areas and the like, during switching operation. In the same manner as the third embodiment, these factors are adjusted, taking into account pump capacities and switching pressure.

Timing of switching of electromagnetic directional switching valve 40 between energization (ON) and de-energization (OFF) is determined by the control unit depending on the engine operating condition. The timing of switching is not limited to such timing (such switching order) as indicated in FIG. 20. In lieu thereof, the timing of switching may be determined such that a transition from a state corresponding to the engine speed range "a" to a state corresponding to the engine speed range "c" occurs or a transition from a state corresponding to the engine speed range "b" to a state corresponding to the engine speed range "d" occurs.

The object and effects of the second oil filter 2 and the failsafe method are the same as the first embodiment and the third embodiment. That is, when undesirable clogging of the second oil filter 2 and a failure of electromagnetic directional switching valve 40 (an undesirable de-energized state due to breaking of the harness) have occurred concurrently, there is a less introduction of oil pressure to the pilot pressure introduction port 55 of pilot valve 50. As a result, spool valve 53 becomes held seated. Thus, fluid-communication between the first control oil chamber 31 and the drain port 58 becomes established. Hence, the eccentricity of cam ring 17 is maintained at its maximum value, and therefore there is a less possibility that the cam ring inadvertently moves.

[Failure Diagnosis]

In the first to fourth embodiments, the system is configured such that a failure diagnosis can be made by means of an oil pressure sensor or an oil pressure switch, which sensor/switch is generally disposed in the main oil gallery 05. The system is preset such that the oil pressure becomes less than a predetermined oil pressure at a given revolution speed and a given oil temperature when electromagnetic directional switching valve 40 is in its energized mode. Also, the system is preset such that the oil pressure becomes higher than a predetermined oil pressure at a given revolution speed and a given oil temperature when electromagnetic directional switching valve 40 is in its de-energized mode.

When the actual discharge pressure differs from a preset oil pressure corresponding to a command to the electromagnetic directional switching valve 40, it is determined that some failure has occurred, and thus a warning lamp becomes turned ON and also electromagnetic directional switching valve 40 becomes shifted to its de-energized state such that the pump discharge pressure becomes shifted to a high pressure control state.

REFERENCE SIGNS LIST

04 . . . Discharge flow path
05 . . . Main oil gallery
1 . . . First oil filter
2 . . . Second oil filter
2a . . . Main body
2b . . . Mesh member
3 . . . First branch flow path
4 . . . Second branch flow path
5 . . . Drain flow path
6 . . . Supply-and-drain flow path
10 . . . Oil pump
11 . . . Pump body (Housing)
12 . . . Cover member (Housing)
13 . . . Pump storage chamber 14 ... Drive shaft
15 ... Rotor
16 ... Vanes
17 ... Cam ring
18 ... Spring (Biasing mechanism)
20 ... Pump chambers (Operating oil chambers)
21 ... Suction port (Suction part)
22 ... Discharge port (Discharge part)
25a ... First communication hole (First control chamber flow path)
25b ... Second communication hole (Second control chamber flow path)
31 ... First control oil chamber (First control chamber)
32 ... Second control oil chamber (Second control chamber)
33 ... First pressure-receiving surface
34 ... Second pressure-receiving surface
40 ... Electromagnetic directional switching valve (Electromagnetic valve)
50 ... Pilot valve

The invention claimed is:

1. A variable-capacity oil pump for discharging oil into a main oil gallery comprising:
   a rotor rotationally driven by an internal combustion engine;
   a plurality of vanes retractably located in an outer periphery of the rotor;
   a cam ring that houses the rotor and the vanes on an inner peripheral side to define a plurality of operating oil chambers, and change an eccentricity of a center of an inner peripheral surface of the cam ring from a rotation center of the rotor by a displacement of the cam ring;
   a suction part having a structure that opens into the operating oil chambers whose volumes increase by rotationally driving the rotor;
   a discharge part having a structure that opens into the operating oil chambers whose volumes decrease by rotationally driving the rotor;
   a biasing mechanism that biases the cam ring in a direction in which the eccentricity of the cam ring with respect to the rotation center of the rotor increases;
   a first control chamber defined on an outer peripheral side of the cam ring and that applies a force, caused by introduction of oil pressure from the main oil gallery into the first control chamber, to the cam ring in a direction in which the eccentricity of the cam ring with respect to the rotor decreases;
   a second control chamber defined on the outer peripheral side of the cam ring and that applies a force, caused by introduction of the oil pressure from the main oil gallery into the second control chamber, to the cam ring in the direction in which the eccentricity of the cam ring with respect to the rotor increases;
   a first branch flow path that is branched from the main oil gallery and that communicates with the first control chamber;
   a second branch flow path that is branched from the first branch flow path and that communicates with the second control chamber;
   an electromagnetic valve that is connected to the second branch flow path and that establishes fluid-communication between the second control chamber and the main oil gallery in a de-energized state, and that establishes fluid-communication between the second control chamber and a low-pressure part in an energized state; and
   an oil filter disposed between a junction of the first branch flow path to the main oil gallery and a branch part at which the second branch flow path is branched from the first branch flow path.

2. A variable-capacity oil pump as recited in claim 1, wherein:
   the electromagnetic valve is shifted to the de-energized state, when an actual discharge pressure in the main oil gallery differs from a given pressure corresponding to a given command state to the electromagnetic valve.

3. A variable-capacity oil pump as recited in claim 2, wherein:
   a warning lamp is turned ON, when the actual discharge pressure in the main oil gallery differs from the given pressure corresponding to the given command state to the electromagnetic valve.

4. A variable-capacity oil pump for discharging oil into a main oil gallery comprising:
   pump components rotationally driven by an internal combustion engine to change volumes of a plurality of operating oil chambers and to discharge the oil;
   a variable mechanism that alters variations of the volumes of the operating oil chambers by movement of a movable member;
   a suction part having a structure that opens into the operating oil chambers whose volumes increase by rotationally driving the pump components;
   a discharge part having a structure that opens into the operating oil chambers whose volumes decrease by rotationally driving the pump components;
   a biasing mechanism that biases the movable member in a direction in which the variations of the volumes of the operating oil chambers increase;
   a first control chamber that applies a force, caused by introduction of the oil from the main oil gallery into the first control chamber, to the movable member in a direction in which the variations of the volumes of the operating oil chambers decrease;
   a second control chamber that applies a force, caused by introduction of the oil from the main oil gallery into the second control chamber, to the movable member in the direction in which the variations of the volumes of the operating oil chambers increase;
   a first branch flow path that is branched from the main oil gallery and that communicates with the first control chamber;
   a second branch flow path that is branched from the first branch flow path and that communicates with the second control chamber;
   an electromagnetic valve that is connected to the second branch flow path and that establishes fluid-communication between the second control chamber and the main oil gallery in a de-energized state, and that establishes fluid-communication between the second control chamber and a low-pressure part in an energized state; and
   an oil filter disposed between a junction of the first branch flow path to the main oil gallery and a branch part at which the second branch flow path is branched from the first branch flow path.

5. In an oil supply system configured to supply oil from a variable-capacity oil pump to a main oil gallery, the variable-capacity oil pump comprising:
   a rotor rotationally driven by an internal combustion engine;
   a plurality of vanes retractably located in an outer periphery of the rotor;

a cam ring that houses the rotor and the vanes on an inner peripheral side to define a plurality of operating oil chambers, and that changes an eccentricity of a center of an inner peripheral surface of the cam ring from a rotation center of the rotor by a displacement of the cam ring;

a suction part having a structure that opens into the operating oil chambers whose volumes increase by rotationally driving the rotor;

a discharge part having a structure that opens into the operating oil chambers whose volumes decrease by rotationally driving the rotor;

a biasing mechanism that biases the cam ring in a direction in which the eccentricity of the cam ring with respect to the rotation center of the rotor increases;

a first control chamber defined on an outer peripheral side of the cam ring and that applies a force, caused by introduction of oil pressure from the main oil gallery into the first control chamber, to the cam ring in a direction in which the eccentricity of the cam ring with respect to the rotor decreases;

a second control chamber defined on the outer peripheral side of the cam ring and that applies a force, caused by introduction of the oil pressure from the main oil gallery into the second control chamber, to the cam ring in the direction in which the eccentricity of the cam ring with respect to the rotor increases;

a first branch flow path that is branched from the main oil gallery and that communicates with the first control chamber;

a second branch flow path that is branched from the first branch flow path and that communicates with the second control chamber;

an electromagnetic valve that is connected to the second branch flow path and that establishes fluid-communication between the second control chamber and the main oil gallery in a de-energized state, and that establishes fluid-communication between the second control chamber and a low-pressure part in an energized state; and an additional oil filter disposed between a junction of the first branch flow path to the main oil gallery and a branch part at which the second branch flow path is branched from the first branch flow path.

6. An oil supply system as recited in claim 5, further comprising:

a main oil filter disposed in the main oil gallery;

a bypass flow path that permits the oil to flow through the bypass flow path, bypassing the main oil filter, when a pressure difference between upstream and downstream sides of the main oil filter exceeds a predetermined value; and a one-way bypass valve disposed in the bypass flow path.

7. An oil supply system as recited in claim 6, wherein:

a mesh of the main oil filter is dimensioned to be smaller in size than the additional oil filter.

8. An oil supply system configured to supply oil from a variable-capacity oil pump to a main oil gallery, the oil supply system comprising:

pump components rotationally driven by an internal combustion engine to change volumes of a plurality of operating oil chambers and to discharge the oil;

a variable mechanism that alters variations of the volumes of the operating oil chambers by movement of a movable member;

a suction part having a structure that opens into the operating oil chambers whose volumes increase by rotationally driving the pump components;

a discharge part having a structure that opens into the operating oil chambers whose volumes decrease by rotationally driving the pump components;

a biasing mechanism that biases the movable member in a direction in which the variations of the volumes of the operating oil chambers increase;

a first control chamber that biases a force, caused by introduction of the oil from the main oil gallery into the first control chamber, to the movable member in a direction in which the variations of the volumes of the operating oil chambers decrease;

a second control chamber that applies a force, caused by introduction of the oil from the main oil gallery into the second control chamber, to the movable member in the direction in which the variations of the volumes of the operating oil chambers increase;

a first branch flow path that is branched from the main oil gallery and that communicates with the first control chamber;

a second branch flow path that is branched from the first branch flow path and that communicates with the second control chamber;

an electromagnetic valve that is connected to the second branch flow path and that establishes fluid-communication between the second control chamber and the main oil gallery in a de-energized state, and that establishes fluid-communication between the second control chamber and a low-pressure part in an energized state; and an oil filter disposed between a junction of the first branch flow path to the main oil gallery and a branch part at which the second branch flow path is branched from the first branch flow path.

\* \* \* \* \*